(12) United States Patent
Oizumi

(10) Patent No.: US 9,319,545 B2
(45) Date of Patent: Apr. 19, 2016

(54) IMAGE READING DEVICE

(71) Applicant: SEIKO EPSON CORPORATION, Shinjuku-ku (JP)

(72) Inventor: Takao Oizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/788,237

(22) Filed: Jun. 30, 2015

(65) Prior Publication Data

US 2015/0381837 A1 Dec. 31, 2015

(30) Foreign Application Priority Data

Jun. 30, 2014 (JP) ................................. 2014-133753

(51) Int. Cl.
*H04N 1/04* (2006.01)
*H04N 1/00* (2006.01)

(52) U.S. Cl.
CPC ................................. *H04N 1/00559* (2013.01)

(58) Field of Classification Search
CPC .......... B65H 2511/30; B65H 2511/22; B65H 2511/415; B65H 2220/02; B65H 2301/42324; B65H 2404/6111; B65H 2405/32; B65H 2553/41; B65H 2701/186; B65H 29/32; H04N 2201/0094; H04N 2201/0081; H04N 1/0055
USPC ............... 358/1.9, 474, 1.13, 1.14, 1.15, 468, 358/482, 483, 488, 497, 498; 271/207, 213, 271/223, 258.01, 265.01, 270, 314; 355/47, 355/73, 87, 91, 94, 95; 399/23, 363, 367
See application file for complete search history.

(56) References Cited

U.S. PATENT DOCUMENTS

| | | | | |
|---|---|---|---|---|
| 3,625,611 A | * | 12/1971 | Orr | G03F 9/00 355/87 |
| 5,100,039 A | * | 3/1992 | Kingston | B26B 27/00 225/91 |
| 5,860,647 A | * | 1/1999 | Ikesue | B65H 29/14 271/207 |
| 6,456,365 B1 | * | 9/2002 | Hosaka | B41J 29/13 347/101 |
| 7,528,856 B2 | * | 5/2009 | Kato | B41J 2/471 347/242 |
| 7,970,337 B2 | * | 6/2011 | Uchida | G03G 15/605 399/367 |
| 8,081,365 B2 | * | 12/2011 | Kato | G02B 26/08 347/257 |
| 8,493,588 B2 | * | 7/2013 | Tan | G06F 21/608 358/1.14 |
| 8,662,498 B2 | * | 3/2014 | Ito | B65H 31/02 271/163 |
| 8,831,982 B2 | * | 9/2014 | Watanabe | B41J 29/02 705/24 |
| 9,019,332 B2 | * | 4/2015 | Otoguro | G03G 15/04045 347/245 |
| 9,191,542 B2 | * | 11/2015 | Urita | H04N 1/10 |

FOREIGN PATENT DOCUMENTS

| | | |
|---|---|---|
| JP | 2000-261601 A | 9/2000 |
| JP | 2007-060143 A | 3/2007 |

* cited by examiner

*Primary Examiner* — Negussie Worku
(74) *Attorney, Agent, or Firm* — Workman Nydegger

(57) ABSTRACT

There is provided an image reading device which includes an original retaining portion that includes an ADF unit which rotates to be capable of opening and closing in relation to an image reading surface, and a reinforcing member, and that retains the original which is placed on the image reading surface in a state in which the ADF unit is closed, and first and second fixing members which are elastic and serve as fixing portions which fix the reinforcing member to the ADF unit, in which, when the ADF unit is opened, a stretch amount of the second fixing member is less than that of the first fixing member, and in which, at the free end side of the ADF unit, a corner side of the sheet-shaped member separates from the image reading surface before the center side.

6 Claims, 17 Drawing Sheets

FIG. 1
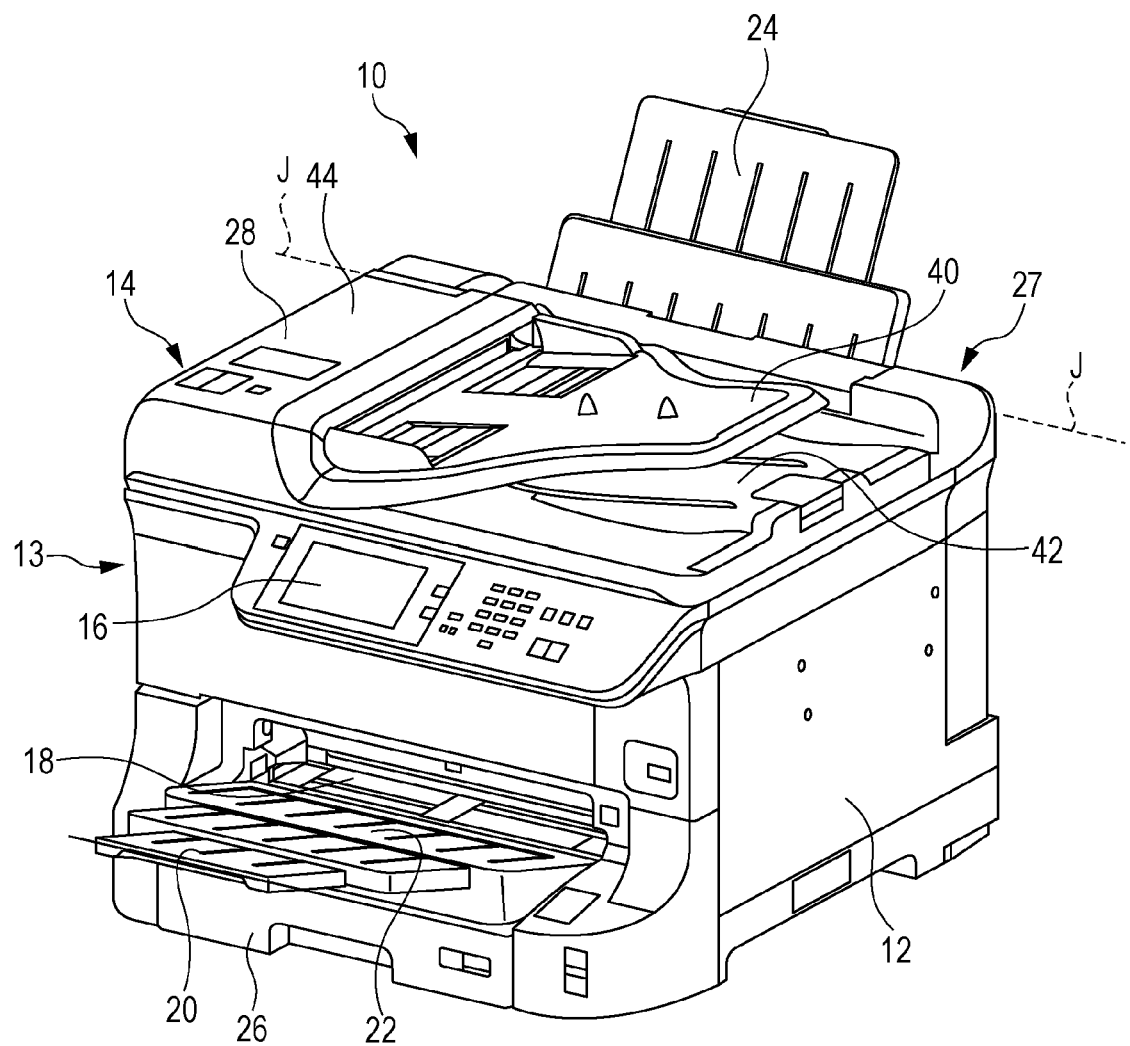
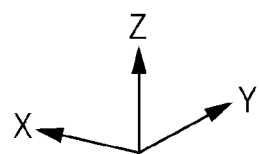

IMAGE READING DEVICE

BACKGROUND

1. Technical Field

The present invention relates to an image reading device.

2. Related Art

An underside (the surface which faces an original platen glass) of a cover which opens and closes on the original platen glass of a so-called flatbed scanner, which is an example of the image reading device and performs reading of an image of an original which is placed on original platen glass while causing a reading sensor to move, is provided with an original retaining portion which retains the original when the cover is closed. For example, the original retaining portion is configured to include an elastic member formed of sponge, urethane, or the like, and is capable of deforming to an extent according to the shape of the original.

When the original retaining portion is fixed to the underside of the cover, depending on the working accuracy and the assembly accuracy, there is a case in which the pressing force from the original retaining portion does not apply uniformly to the original platen glass surface. Therefore, there is a flatbed scanner in which the influence of the working accuracy and the assembly accuracy of the cover is reduced. This is achieved by providing the flatbed scanner with a configuration which fixes the original retaining portion, which is formed of a laminated structure obtained by interposing an elastic member between a sheet-shaped member which serves as the pressing surface of the original and a reinforcing plate, to the cover using an elastic buffer member.

In such a flatbed scanner, there is a case in which the original retaining portion adheres to the original platen glass when the cover is closed in a state in which no original is placed on the original platen glass. When a user attempts to rotate and open the cover in the state in which the original retaining portion is adhered to the original platen glass, the buffer member or the like peels off of the original retaining portion.

Therefore, for example, in the image reading device of JP-A-2000-261601, a configuration is disclosed in which a sheet-shaped member which is larger than the original platen glass is provided on the original retaining portion by positioning the end portion of the sheet-shaped member at an edge portion which is formed a level higher than the surface of the original platen glass when the cover is in the closed state, a gap is provided between the end portion of the sheet-shaped member and the original platen glass.

However, in the configuration of JP-A-2000-261601, there is a problem in that there is a concern that the adherence of the original to the original platen glass by the original retaining portion will be reduced. The invention solves the problem which comes with the adherence of the original retaining portion to the original platen glass when the cover is rotated while securing the adherence of the original to the original platenlass by the original retaining portion when the cover of the flatbed scanner is closed.

SUMMARY

The invention can be realized in the following forms or application examples.

Application Example 1

There is provided an image reading device which includes an original retaining portion that includes an original receiving member on which an original which is read by an image reading sensor is placed, an opening and closing body which includes a rotational shaft and rotates to be capable of opening and closing in relation to the original receiving member, a sheet-shaped member capable of abutting the original receiving member, an elastic member which is bonded to the sheet-shaped member, and a reinforcing member which is bonded to an opposite side from the sheet-shaped member of the elastic member and reinforces the elastic member, and that retains the original which is placed on the original receiving member in a state in which the opening and closing body is closed, and a plurality of fixing portions which are elastic, transmit a weight of the opening and closing body to the reinforcing member in a state in which the opening and closing body is closed, and fix the reinforcing member to the opening and closing body, in which, in a free end side which is distanced from the rotational shaft in the reinforcing member, the fixing portions include a first fixing portion which is disposed on a corner side of the reinforcing member, and a second fixing portion which is disposed closer to a center side of the reinforcing member than the first fixing portion, in which, when the opening and closing body is opened, a stretch amount of the first fixing portion is less than that of the second fixing portion, and in which, at the free end side of the opening and closing body, a corner side of the sheet-shaped member separates from the original receiving member before the center side.

According to the application example, there are provided a plurality of fixing portions which are elastic, in a state in which the opening and closing body is closed, transmit the weight of the opening and closing body to the reinforcing member, and fix the reinforcing member to the opening and closing body. Accordingly, the adherence of the original to the original receiving member is secured. When the opening and closing body is opened, the stretch amount of the first fixing portion is less than that of the second fixing portion, and at the free end side of the opening and closing body, the corner side of the sheet-shaped member separates from the original receiving member before the center side. Accordingly, air flows in from the gap which is formed between the sheet-shaped member and the original receiving member, and the sheet-shaped member and the original receiving member are released from the state of adhering to each other.

Application Example 2

In the image reading device, the opening and closing body is further provided with an original transport unit which transports the original, and the first fixing portion is disposed on the original transport unit side.

According to the application example, when the user lifts the heavier side which is provided with the original transport unit using the hand of the user in the opening and closing body, the gap is formed on the side in the reinforcing member which is provided with the original transport unit.

Application Example 3

In the image reading device, the fixing portions include a third fixing portion which has a greater stretch amount than the first fixing portion, reinforces the first fixing portion in a state in which the opening and closing body is closed, transmits the weight of the opening and closing body to the reinforcing member, and is disposed on at least one side of an end portion which forms a corner of the reinforcing member.

According to the application example, when the opening and closing body is opened, air flows in from the gap which is formed between the sheet-shaped member and the original receiving member and the sheet-shaped member and the original receiving member are released from the state of adhering to each other while securing the adherence of the original to the original receiving member in the state in which the opening and closing body is closed.

Application Example 4

In the image reading device the first fixing portion and the second fixing portion are formed of a same member, and a thickness of the first fixing portion is less than a thickness of the second fixing portion.

According to the application example, the stretch amount of the first fixing portion is less than the stretch amount of the second fixing portion. Accordingly, when the opening and closing body which is in a state of being closed on the original receiving member is rotated in the opening direction, the portion of the reinforcing member which is fixed to the first fixing portion deforms so as to approach the opening and closing body side before the portion of the reinforcing member which is fixed to the second fixing portion.

Application Example 5

In the image reading device, the first fixing portion is disposed on an edge portion of the reinforcing member.

According to the application example, since the edge portion of the reinforcing member deforms so as to approach the opening and closing body side before the other portions, a gap is easily formed between the edge portion of the reinforcing member and the original receiving member.

Application Example 6

In the image reading device, bonding surfaces of the first fixing portion with the reinforcing member and the opening and closing body are wider than bonding surfaces of the second fixing portion with the reinforcing member and the opening and closing body.

According to the application example, it is possible to suppress the occurrence of the first fixing portion peeling off from the reinforcing member and the opening and closing body.

BRIEF DESCRIPTION OF THE DRAWINGS

The invention will be described with reference to the accompanying drawings, wherein like numbers reference like elements.

FIG. 1 is an external perspective view of a multifunction printer.

DESCRIPTION OF EXEMPLARY EMBODIMENTS

Figure 2:
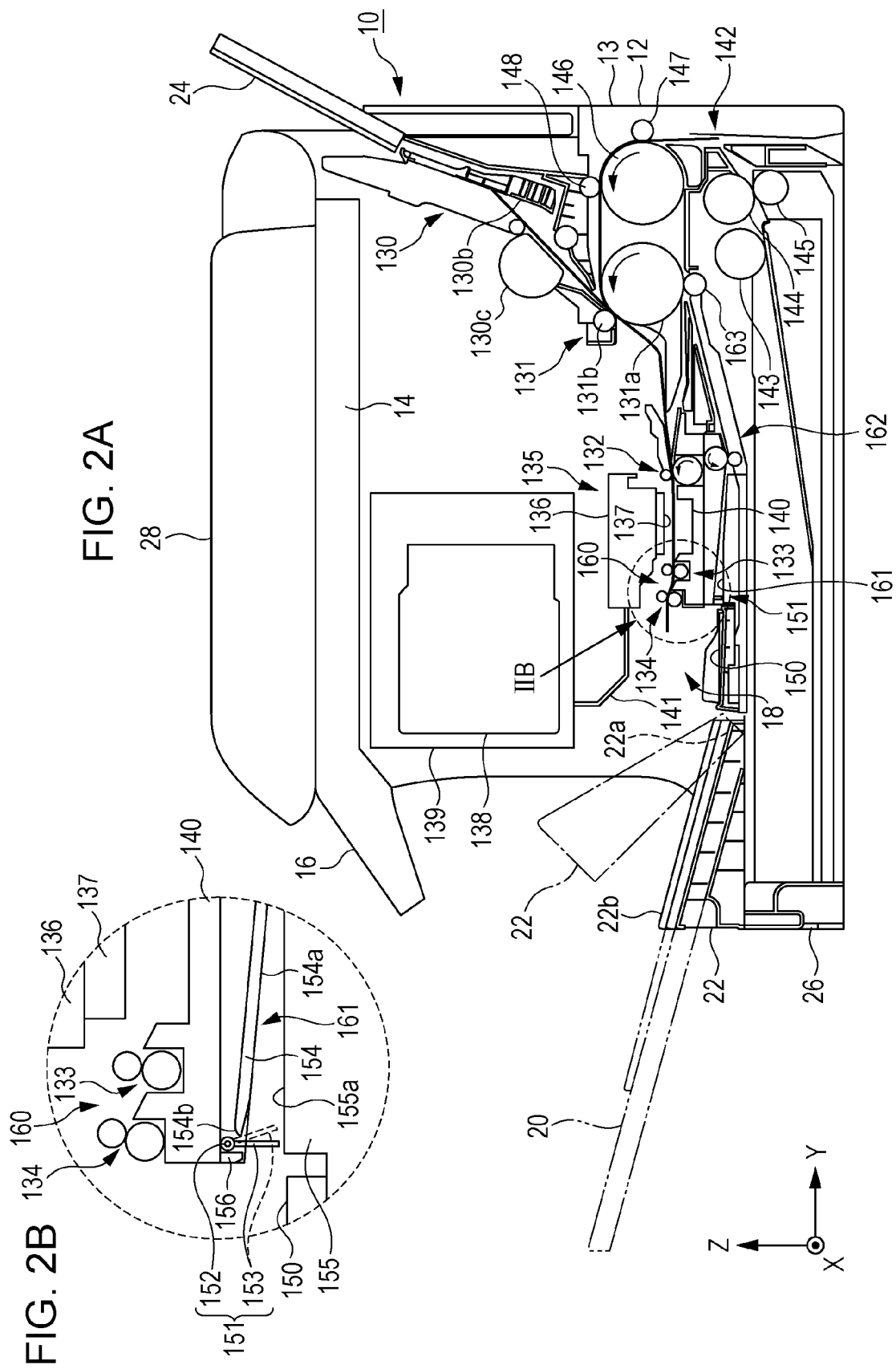
FIG. 2A is a cross sectional side view for illustrating the schematic configuration of a recording apparatus.
FIG. 2B is an enlarged diagram of a portion which is provided with a restriction member.

Hereinafter, description will be given of the embodiments according to the diagrams.

Embodiment 1

FIG. 1 is an external perspective view of a multifunction printer 10 according to the embodiment 1. The multifunction printer 10 is provided with a device main body 12 which has an overall shape which is substantially cuboid. The device main body 12 is provided with a recording device 13 and an image reading device 14. The device main body 12 performs recording (printing) on paper, which is an example of a recording medium, and the image reading device 14 is provided on the recording device 13 and is capable of reading originals and the like. In an X-Y-Z coordinate system, the X direction illustrates a transportation direction of the original in the image reading device 14, the Y direction illustrates the width direction of the original, and the Z direction illustrates the height direction of the image reading device 14.

The image reading device 14 is provided with an automatic original feeder unit (hereinafter, the ADF unit) 27. The ADF unit 27 is provided to be capable of rotating by using the rear surface side (the +Y axial direction side) of the device main body 12 as the fulcrum of a rotational shaft J, and is configured as a "opening and closing body" which is capable of opening and closing in relation to the top portion of the device main body 12.

The ADF unit 27 is provided with an original transport unit 28, an original placing surface 40, and an original output surface 42. The original transport unit 28 is provided with a drive mechanism which transports the original. The original (not shown) which is placed on the original placing surface 40 is fed to the inside portion of the image reading device 14 by the original transport unit 28, is read, and is subsequently output and placed on the original output surface 42. Note that, in the present embodiment, the term "original" is an example of an original such as a photograph or a document.

An operation unit 16 is provided on the top portion of the front surface side (the −Y axial direction) of the device main body 12, and the operation unit 16 is configured to be provided with a power button, a print setting button, a display panel, and the like for operating the multifunction printer 10.

A rear surface side tray 24 on which paper (not shown) is placed is provided on the rear surface side (the +Y axial direction side) of the device main body 12. The paper which is placed on the rear surface side tray 24 is fed to a recording unit 135 (refer to FIG. 2A) inside the recording device 13, and is recorded on.

A paper storage unit 26 in which a plurality of sheets of paper (not shown) are stored is provided on the bottom side of a front surface side tray 22. The paper storage unit 26 is provided to be capable of sliding in the Y axial direction at the bottom portion in the device main body 12, and is configured to be attachable to and detachable from the device main body 12. The paper which is placed on the paper storage unit 26 is fed to a recording unit 135 inside the recording device 13, and is recorded on.

A drawer unit 20 which is attached to the front surface side tray 22 and is capable of sliding in the Y axial direction is provided on the front surface side of the device main body 12. The paper which is fed to the recording unit 135 from the rear surface side tray 24 or the paper storage unit 26 and is printed on is output from an opening portion 18 which is provided on the front surface side of the device main body 12, and is placed on the front surface side tray and the drawer unit 20 which is in a state of being pulled out from the front surface side tray 22.

The multifunction printer 10 of the present embodiment is capable of feeding the paper (not shown) which is placed on the front surface side tray 22 and the drawer unit 20 from the opening portion 18 to the inside portion of the recording device 13, and performing recording using the recording unit 135. Accordingly, the front surface side tray 22 and the drawer unit 20 function as a support surface of the paper which is discharged from the inside portion of the recording device 13 to the outside, and function as a support surface of the paper which is fed to the inside portion of the recording device 13.

Next, description will be given of the schematic configuration of the recording device 13. FIG. 2A is a cross sectional side view for illustrating the schematic configuration of the recording device 13 which is disposed on the bottom side (the −Z axial direction) of the image reading device 14. The front surface side tray 22 includes a top surface 22b on which the paper is placed, and, as illustrated by a dot-and-dash line, is provided to be capable of rotating by using a shaft 22a which extends in the X axial direction as the fulcrum. As described previously, the front surface side tray 22 is provided with the drawer unit 20 which is capable of being pulled out to the front side and is illustrated by a double-dot and dash line.

A feed unit 130 which feeds the paper is provided in the rear side top portion inside the recording device 13. The feed unit 130 is provided with the rear surface side tray 24 on which the paper is placed, a hopper 130b, and a feed roller 130c. The paper which is placed on the rear surface side tray 24 is pressed into the feed roller 130c by the operation of the hopper 130b, and is sent toward the downstream side of the transport path by the rotation of the feed roller 130c.

Transport roller pairs 131 and 132 and output roller pairs 133 and 134, which transport the paper from the feed unit 130 toward the front surface side tray 22, are disposed along the transport path inside the recording device 13. The recording unit 135 which records on the paper is disposed in a position between the transport roller pair 132 and the output roller pair 133.

The recording unit 135 is provided with a carriage 136 and a recording head 137. The carriage is capable of moving reciprocally in a main scanning direction (the X axial direction), and the recording head 137 is provided on the bottom portion of the carriage 136.

A cartridge holder 139 is disposed above (the +Z axial direction) the recording unit 135 inside the recording device 13. An ink cartridge 138 which stores an ink is mounted in the cartridge holder 139 in a removable manner. The recording unit 135 is provided with a support portion 140 which supports the paper at a position facing the movement region of the recording head 137 from underneath. The recording head 137 forms an image on the paper by ejecting the ink which is supplied from the ink cartridge 138 through a tube 141 onto the paper which is supported on the support portion 140.

An output transport path 160 which serves as the path along which the paper which is recorded on by the recording head 137 is transported is formed closer to the downstream side in the transport direction (the −Y axial direction) of the paper than the support portion 140. The output transport path 160 is the transport path of the paper which is transported by the output roller pairs 133 and 134. A placing surface 150 which serves as an inside wall portion of the bottom side of the opening portion 18 is provided on the downstream side in the transport direction of the output transport path 160. The rear end side of the paper which is output from the output transport path 160 is placed on the placing surface 150.

A supply unit 142 is provided on the bottom portion of the rear side (the +Y axial direction) inside the recording device 13. The supply unit 142 sends the paper which is stored in the paper storage unit 26 to the feed path toward the recording unit 135, one sheet at a time. The supply unit 142 is provided with a pickup roller 143, a separation roller 144, and a retard roller 145. The pickup roller 143 makes contact with the topmost sheet of the plurality of sheets of paper inside the paper storage unit 26, and the retard roller 145 forms a pair with the separation roller 144.

The supply unit 142 is provided with an intermediate roller 146 which is disposed on the rear side of the transport roller pair 131 and two driven rollers 147 and 148 which pinch the paper between the intermediate roller 146 and the driven rollers 147 and 148. The transport roller pair 131 is provided with an intermediate roller 131a and a driven roller 131b. The intermediate roller 131a is rotationally driven together with the intermediate roller 146, and the driven roller 131b forms a pair with the intermediate roller 131a.

When the pickup roller 143, the separation roller 144, and the intermediate rollers 146 and 131a rotate in the anti-clockwise direction in FIGS. 2A and 2B according to the power of a motor (not shown) which is provided in the device main body 12, the paper which is stored in the paper storage unit 26 is fed to the recording unit 135 via the transport roller pairs 131 and 132, one sheet at a time.

A feed transport path 161 through which the paper is fed from the front surface side to the rear surface side (the +Y axial direction) is formed on the bottom side (the −Z axial direction) of the output transport path 160. The transport roller pair 162 which transports the paper toward the intermediate roller 131a, which is on the rear surface side, is disposed in the feed transport path 161, and the driven roller 163 which pinches the paper between the intermediate roller 131a and the driven roller 163 is provided on the bottom side of the intermediate roller 131a.

The paper which is inserted into the feed transport path 161 from the opening portion 18 is transported to the rear surface side by the transport roller pair 162, the intermediate roller 131a, and the driven roller 163, is inverted by the intermediate roller 146 and the driven rollers 147 and 148, is transported to the recording unit 135 by the intermediate roller 131a, the driven roller 131b, and the transport roller pair 132, and is recorded on.

FIG. 2B is a diagram as viewed from the X axial direction, and is an enlarged diagram of the portion (within the circle illustrated with a broken line A) in which a restriction member 151 is provided in FIG. 2A. A guide surface 154a of a top side wall portion 154 and a guide surface 155a of a bottom side wall portion 155 are provided to face each other, and the feed transport path 161 is a transport path which is provided between the guide surface 154a and the guide surface 155a. The gap between the guide surface 155a and the guide surface 154a is formed such that the distance thereof in the height direction decreases toward the rear side.

The restriction member 151 includes a rocking shaft 152 and a rocking member 153 which is capable of rocking by using the rocking shaft 152 as a fulcrum. The rocking member 153 may be a plate shaped member which extends in the X axial direction, and may be configured such that a plurality of rod shaped members which protrude downward from the rocking shaft 152 are disposed to line up in the X axial direction.

A front side wall portion 156 which protrudes downward from the support portion 140 is provided on the front side of the restriction member 151, and a front side end portion 154b of the top side wall portion 154 is disposed on the rear surface side of the restriction member 151. Therefore, in the range in which the restriction member 151 rocks using the rocking shaft 152 as a fulcrum, as illustrated by the solid line, clockwise rotation in the drawing is restricted by the rocking member 153 abutting the front side wall portion 156, and, as illustrated by the broken line, anticlockwise rocking in the drawing is restricted by the rocking member 153 abutting the front side end portion 154b.

The height of the placing surface 150 is a position of approximately the same height as the guide surface 155a. When the user causes the non-printed paper to move along the placing surface 150 toward the feed transport path 161, the front end portion of the paper presses the rocking member 153, the rocking member 153 assumes the state of being in the rocking position illustrated by the broken line of FIG. 2B, and it is possible to cause the paper to enter toward the transport roller pair 162 from the gap between the rocking member 153 and the guide surface 155a.

Meanwhile, there is a case in which a plurality of sheets of the paper which are printed on by the recording unit 135 and are output from the output transport path 160 assume a state of being placed on the placing surface 150 in a stacked state. In this case, it is possible to restrict the occurrence of the end portion of the restriction member 151 side of the stacked paper collapsing and entering the feed transport path 161, due to the rocking member 153 being fixed in the position of the broken line.

Figure 3:
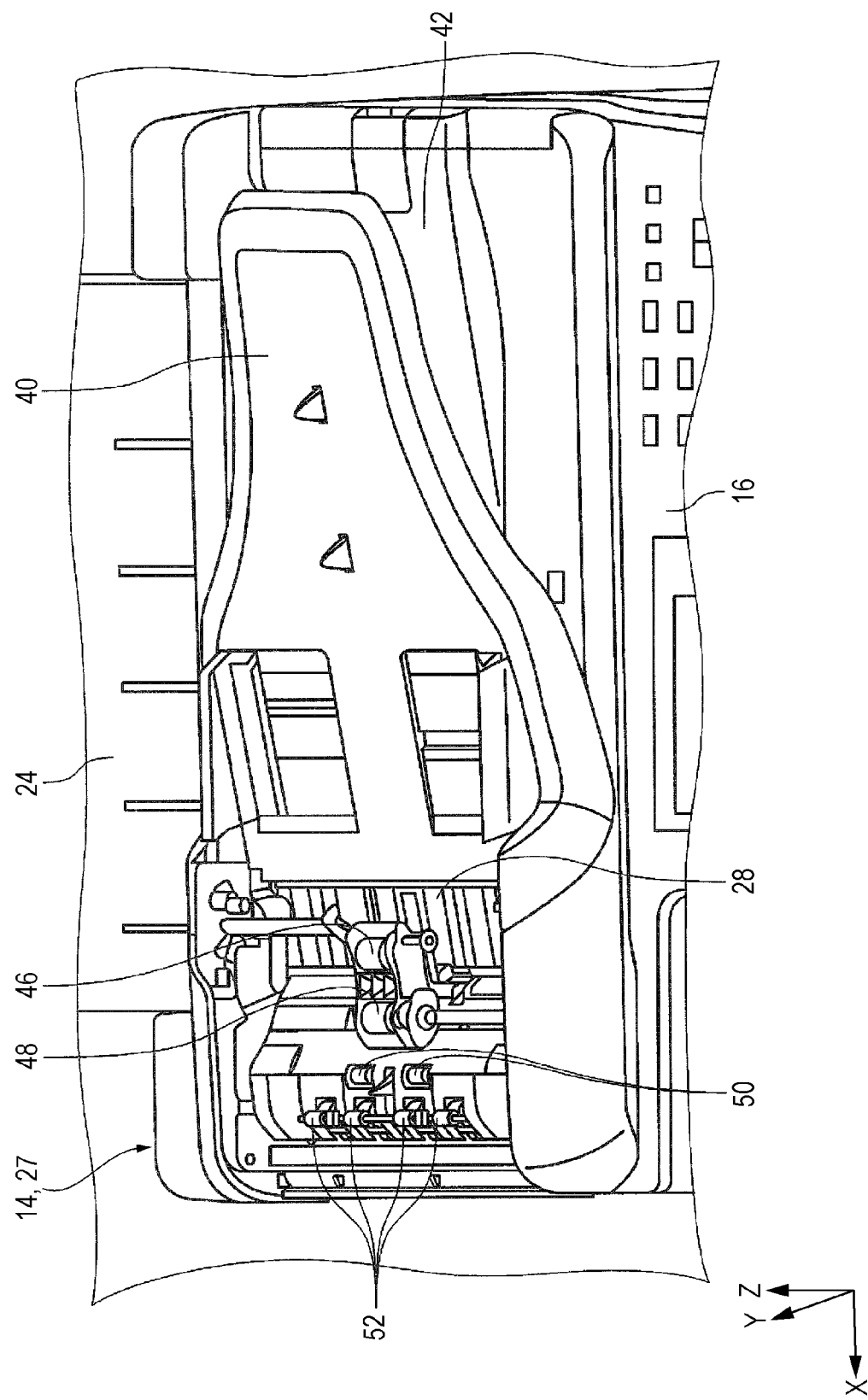
FIG. 3 is a perspective view illustrating an opening and closing body.

Next, description will be given of the image reading device 14. FIG. 3 is a perspective view illustrating the ADF unit 27 which is an opening and closing body, FIG. 4 is a plan view illustrating the disposition of an image reading surface 34 and an image reading surface 36, and FIG. 5 is a cross sectional side view of the drive mechanism unit of the ADF unit 27.

Figure 5:
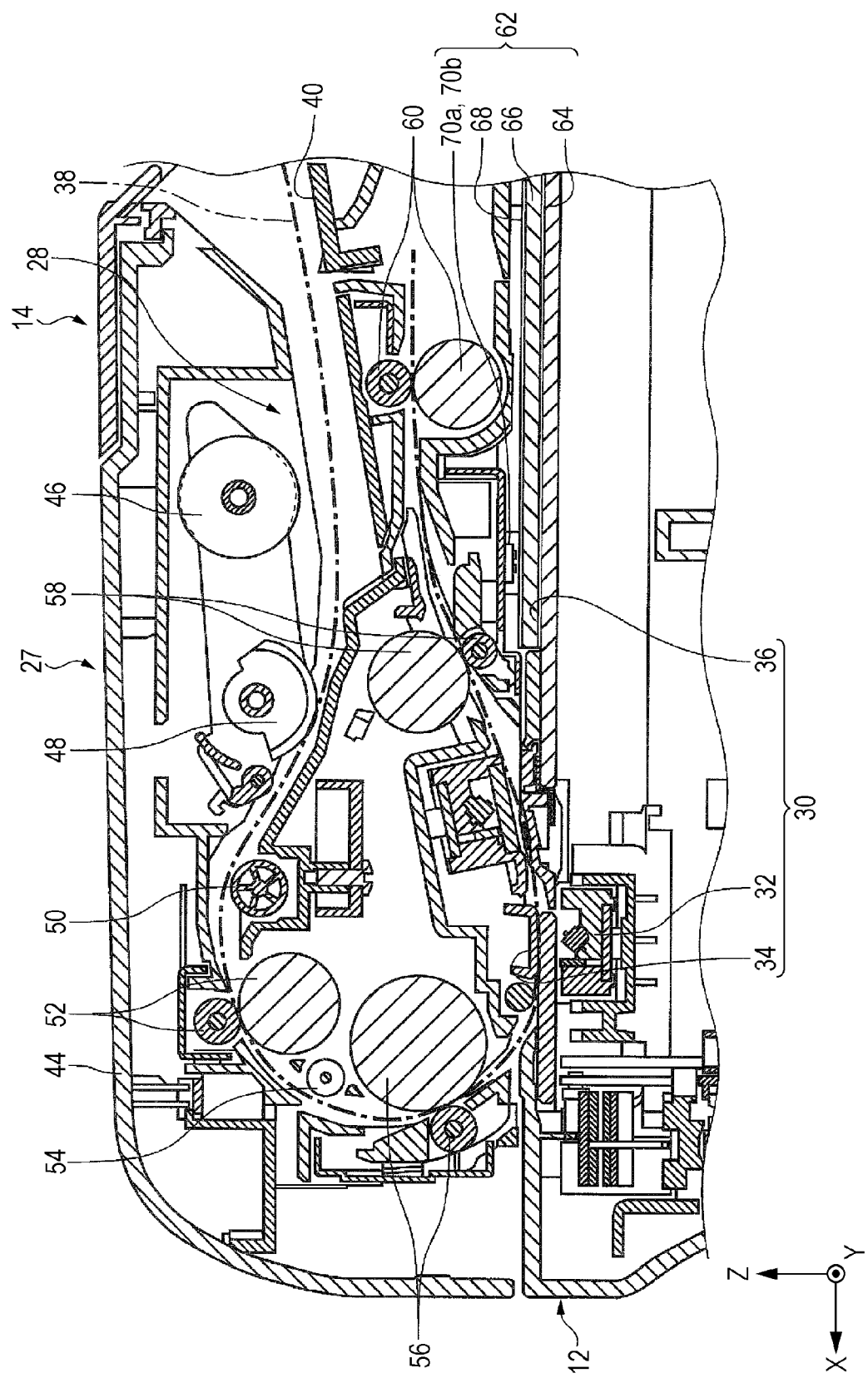
FIG. 5 is a cross sectional side view of a drive mechanism unit of the opening and closing body.

An image reading unit 30 of FIG. 5 is provided with an image reading sensor 32, the image reading surface 34, and the image reading surface 36 which is the "original receiving member". The image reading sensor 32 is configured to be capable of moving in the X axial direction due to the driving mechanism (not shown). The image reading sensor 32 is provided with an optical detector (not shown) for image reading which extends in the Y axial direction.

Figure 4:
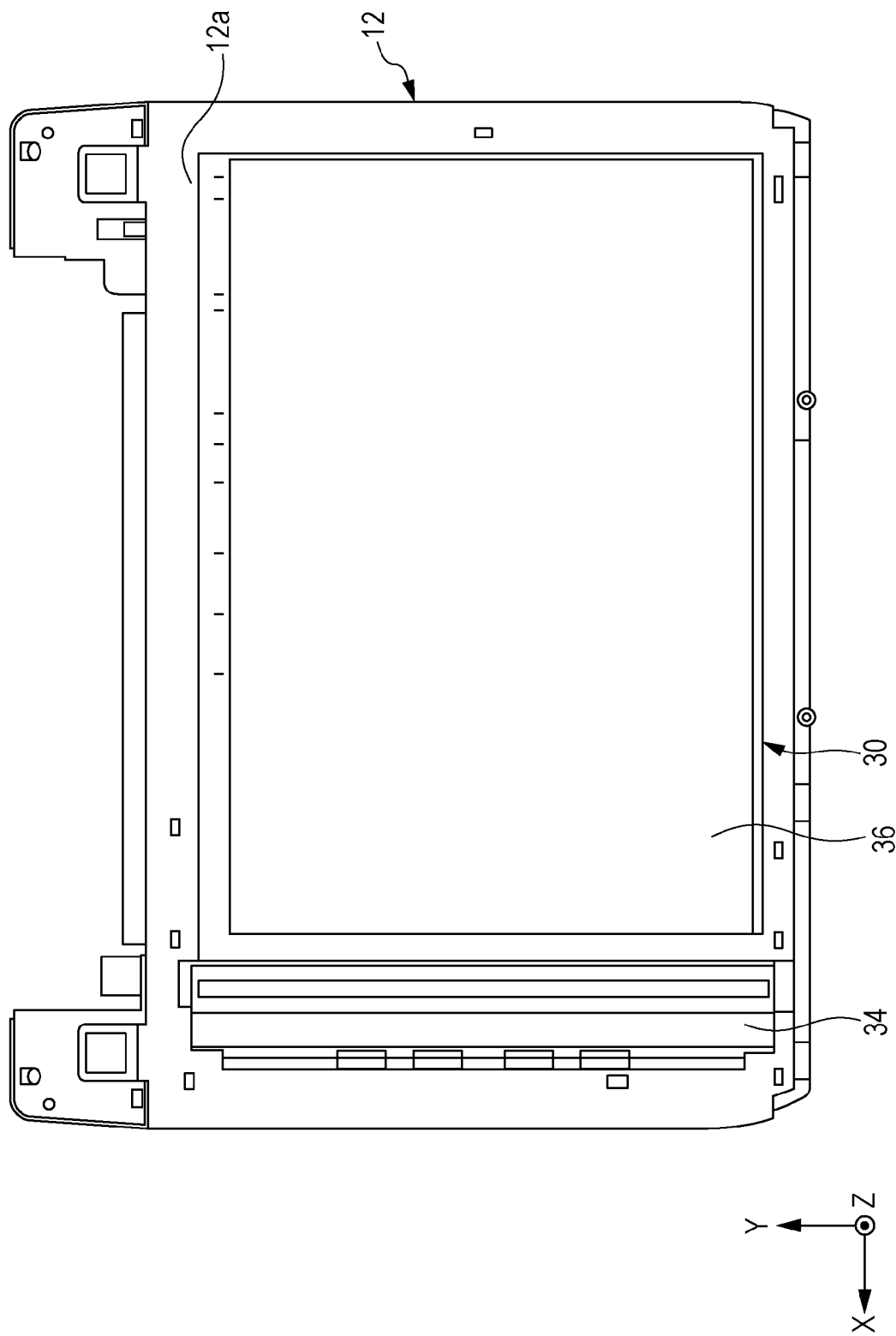
FIG. 4 is a plan view illustrating an original receiving member.

The image reading surface 34 and the image reading surface 36 are disposed in parallel on a top portion 12a of the device main body 12 of FIG. 4. The image reading surface 34 and the image reading surface 36 are formed of a flat and transparent glass plate.

In the image reading surface 36, both end portions in the Y axial direction and the end portion of the −X axial direction side in the X axial direction are supported by a frame (not shown) which is provided inside the device main body 12.

When the image reading surface 34 is in a state in which the ADF unit 27 is closed in relation to the top portion of the device main body 12 illustrated in FIG. 4, the image reading surface 34 is provided to face a portion of the original transport path 38 (refer to the dot-and-dash line of FIG. 5). The length of the image reading surface 34 in the Y axial direction is set according to a direction which intersects a direction (the X axial direction) in which the original which is transported through the original transport path 38, that is, the width direction of the original.

Meanwhile, since, when the portion of the original which is transported along the original transport path 38 abuts the image reading surface 34, the image reading sensor 32 is to be capable of reading the portion of the original which abuts the image reading surface 34, the length of the image reading surface 34 in the X axial direction is set to be shorter than the length of the original in the transport direction and the image reading surface 36. When the original abuts the image reading surface 34, the image reading sensor 32 is capable of reading the original via the image reading surface 34.

The length in the X axial direction and the Y axial direction in the image reading surface 36 is set according to the maximum size of the original at which it is possible to perform a reading operation using the device main body 12. The image reading surface 36 of the multifunction printer 10 of the present embodiment is capable of reading an A3 size original. The reading operation of the original by the image reading surface 36 is performed in a state in which the original is set on the image reading surface 36.

Specifically, in a state in which the ADF unit 27 is open in relation to the device main body 12, the original is set (placed) on the image reading surface 36, and after setting the original, the ADF unit 27 is again set to a state of being closed in relation to the device main body 12. Subsequently, the original which is placed on the image reading surface 36 is read while causing the image reading sensor 32 to move in the X axial direction.

Next, description will be given of the original transport unit 28 of the ADF unit 27 with reference to FIGS. 3 and 5. The original transport unit 28 is provided with the original transport path 38 which extends from the original placing surface 40 to the original output surface 42. The original transport unit 28 is configured to transport the original which is placed on the original placing surface 40 along the original transport path 38 by bending and inverting the original, and to output the original to the original output surface 42.

A cover 44 which covers at least a portion of the original transport path 38 is provided on the original transport unit 28. The cover 44 is capable of assuming a state of covering a portion of the original transport path 38 in relation to the original transport unit 28 (refer to FIG. 1), and a state of exposing a portion of the original transport path 38 (not shown). Note that, to facilitate description, FIG. 3 illustrates the state in which the cover 44 is removed from the original transport unit 28.

The original transport path 38 is provided with a plurality of rollers and a plurality of guide members which are disposed along the original transport path 38, and is capable of transporting the original from the original placing surface 40 to the original output surface 42. A feed roller 46 which is rotationally driven by a drive source (not shown) is provided on the +X axial direction side of the original placing surface 40. When the feed roller 46 abuts the topmost original of the plurality of originals which are placed on the original placing surface 40, the feed roller 46 feeds the topmost original to the downstream side of the original transport path 38.

In the original transport path 38, a separation roller 48, a first transport auxiliary roller 50, a first transport roller pair 52, a second transport auxiliary roller 54, and a second transport roller pair 56 are provided on the downstream side of the feed roller 46 along the transport direction of the original. Note that, the separation roller 48, the first transport roller pair 52, and the second transport roller pair 56 are supplied with power from a power source (not shown), and are configured to be rotationally driven.

The original which is sent to the downstream side in the transport direction by the feed roller 46 is transported along the transport path in the order of the separation roller 48, the first transport auxiliary roller 50, the first transport roller pair 52, the second transport auxiliary roller 54, and the second transport roller pair 56, and reaches the image reading surface 34.

The original which is transported to the image reading surface 34 is read by the image reading sensor 32 which is provided in a position facing the original via the image reading surface 34. In the image reading surface 34, the original which is read by the image reading sensor 32 is transported in the order of a third transport roller pair 58 and an output roller pair 60 which are provided on the downstream side of the image reading surface 34 in the transport path, and is output to the original output surface 42. Note that, the third transport roller pair 58 and the output roller pair 60 are supplied with a drive power by a drive source (not shown), and are configured to be rotationally driven.

Figure 6:
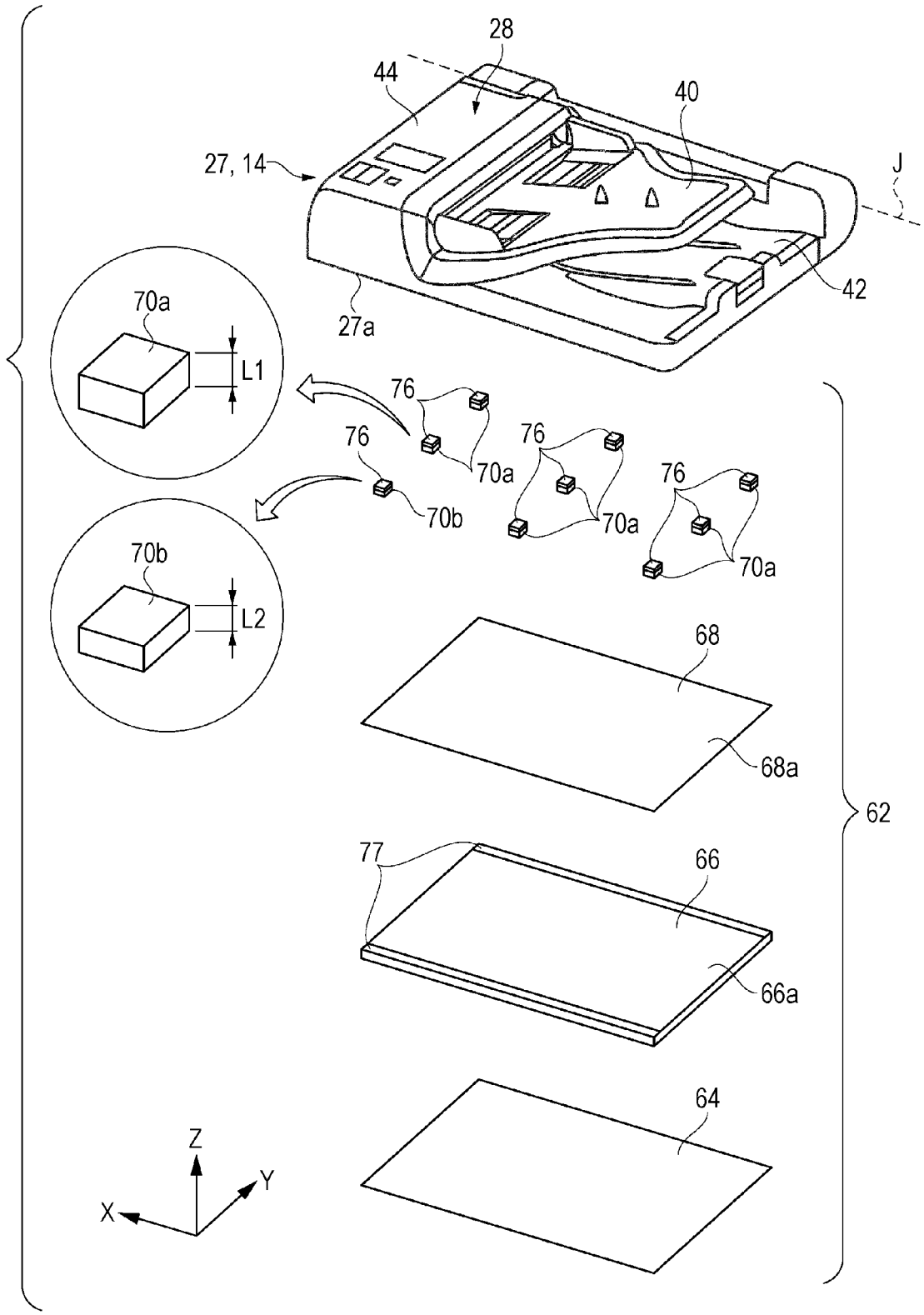
FIG. 6 is an exploded perspective view of an original retaining portion which is attached to the bottom portion of the opening and closing body.
Figure 7:
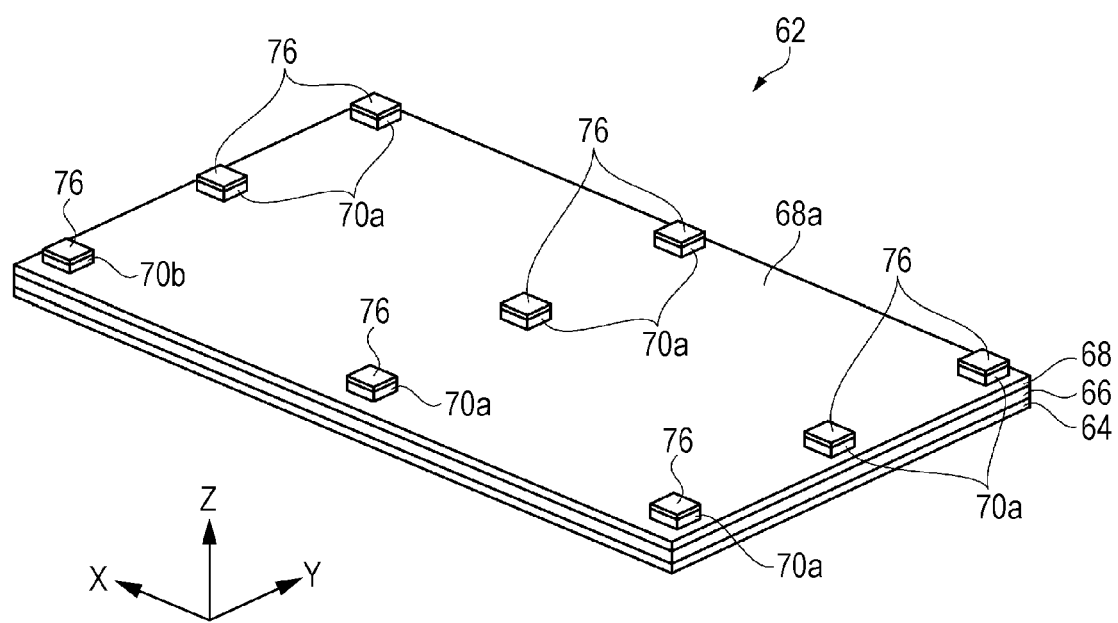
FIG. 7 is a perspective view of the original retaining portion.

Next, description will be given of an original retaining portion. FIG. 6 is an exploded perspective view of an original retaining portion 62 which is attached to the bottom portion of the ADF unit 27. FIG. 7 is a perspective view of the original retaining portion 62. The original retaining portion 62 of FIG. 5 is attached to a region which faces the image reading surface 36 when the ADF unit 27 is in a state of being closed in relation to the device main body 12.

The original retaining portion 62 is provided with a sheet-shaped member 64, an elastic member 66, a reinforcing member 68, and fixing members 70a and 70b, and is configured as a "laminate" as illustrated in FIG. 7. The sheet-shaped member 64 is disposed on the side of the original retaining portion 62 which faces the image reading surface 36, that is, the side which is close to the original. In the present embodiment, the sheet-shaped member 64 is configured of a polypropylene (PP) material which is 0.2 mm thick. The sheet-shaped member 64 is formed at a size corresponding to the image reading surface 36 of FIG. 4.

The elastic member 66 is disposed on the +Z axial direction side of the sheet-shaped member 64 of FIG. 6. In the present embodiment, the elastic member 66 is formed of a sponge material which is 3 mm thick. The elastic member 66 is also formed at a size corresponding to the image reading surface 36, that is, is formed at the same size as the sheet-shaped member 64. The sheet-shaped member 64 and the elastic member 66 are adhered to each other over the entire surfaces thereof by an adhesive material. An adhesive tape 77 which extends in the X axial direction is stuck to the surface of the +Z axial direction side of the elastic member 66, that is, both end portions of the Y axial direction sides on a top surface 66a.

The plate shaped reinforcing member 68 is disposed on the +Z axial direction side of the elastic member 66. In the present embodiment, the reinforcing member 68 is formed of a polycarbonate material which is 1 mm thick. The reinforcing member 68 is formed at a size corresponding to the image reading surface 36 in the same manner as the sheet-shaped member 64 and the elastic member 66. The reinforcing member 68 is stuck to the elastic member 66 via the adhesive tape 77 which is provided on both end portions of the Y axial direction sides of the elastic member 66.

The fixing members 70a and 70b are disposed on the top surface 68a of the +Z axial direction side of the reinforcing member 68 in FIG. 6. In the present embodiment, the fixing members 70a and 70b are formed of a sponge material.

The fixing members 70a and 70b illustrated inside circles in FIG. 6 are respectively enlarged perspective views of the fixing members 70a and 70b illustrated in the exploded perspective view of the original retaining portion 62. The fixing members 70a and 70b are cuboids in which the shape as viewed from the Z axial direction is a square of the same size (in the present embodiment, the length of one side is 15 mm).

A thickness L2 (for example, 4 mm) of the fixing member 70b in the Z axial direction is less than a thickness L1 (for example, 8 mm) of the fixing member 70a in the Z axial direction. An adhesive tape 76 is stuck to the surface of the +Z axial direction side, that is, the top surface, and the surface of the −Z axial direction side, that is, the bottom surface of the fixing members 70a and 70b.

As illustrated in FIG. 7, nine fixing members formed of the fixing members 70a and 70b are disposed with eight around the edge portion of the top surface 68a of the reinforcing member 68 and one in the middle portion. Three rows, in each of which three of the fixing members line up at both end portions and the center portion in the Y axial direction, are lined up at both end portions and the center portion in the X axial direction, such that there are a total of nine fixing members stuck to the top surface 68a of the reinforcing member 68. In other words, the distance between adjacent fixing members in the X axial direction and the distance of the same in the Y axial direction are disposed uniformly. The one fixing member 70b among the nine fixing members is disposed at the end portion in the +X axial direction in the end portion in the −Y axial direction.

The surface of the +Z axial direction side (the top surface) of the fixing members 70a and 70b is stuck to a bottom portion 27a of the ADF unit 27 in a region which faces the image reading surface 36 via the adhesive tape 76. The surface of the −Z axial direction side (the bottom surface) of the fixing members 70a and 70b is stuck to the top surface 68a of the reinforcing member 68 via the adhesive tape 76.

Figure 8:
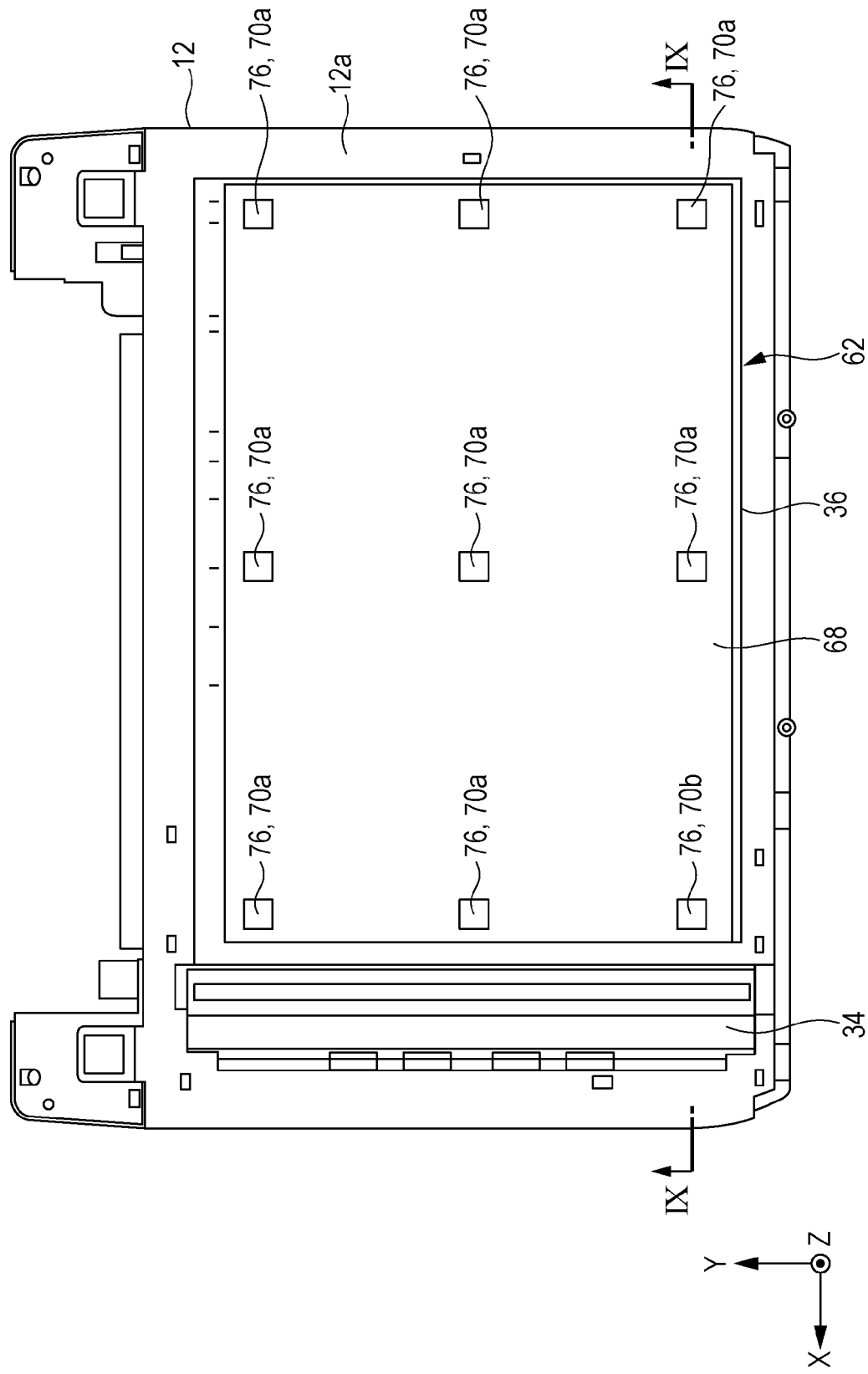
FIG. 8 is a plan view illustrating the positional relationship of the original retaining portion to the original receiving member.

FIG. 8 is a plan view illustrating the positional relationship of the original retaining portion 62 to the image reading surface 36 in a state in which the ADF unit 27 is closed in relation to the device main body 12. The original retaining portion 62 abuts the entire surface of the image reading surface 36 in a position corresponding to the image reading surface 36 in a state in which the ADF unit 27 is closed in relation to the device main body 12.

Figure 9:
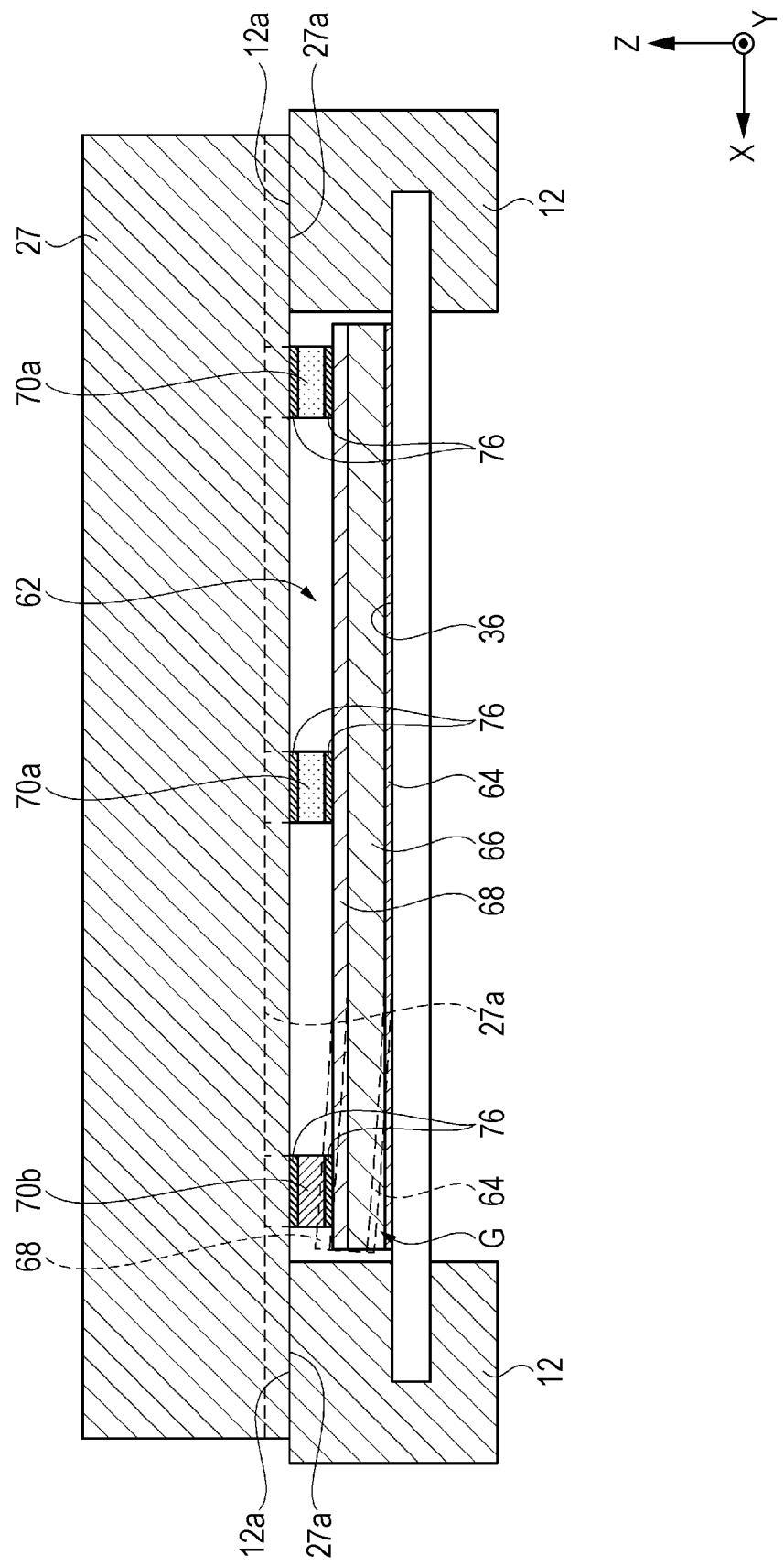
FIG. 9 is a cross sectional diagram illustrating the positional relationship of the original retaining portion to the original receiving member.

FIG. 9 is a diagram as viewed from the Y axial direction and is a cross sectional diagram taken along the line IX-IX of the cross section position of FIG. 8 illustrating the positional relationship of the original retaining portion 62 to the image reading surface 36 in a state in which the ADF unit 27 is closed on the image reading surface 36 on which an original is not placed. In a state in which the ADF unit 27 is closed in relation to the device main body 12, that is, in a state in which the bottom portion 27a of the ADF unit 27 abuts the top portion 12a of the device main body 12, the elastic member 66 and the fixing members 70a and 70b of the original retaining portion 62 are compressed by the reinforcing member 68 and the ADF unit 27.

Therefore, the compressive force which is generated in the elastic member 66 and the fixing members 70a and 70b serves as a pressing force and uniformly presses the original (not shown) which is positioned on the −Z axial direction side of the sheet-shaped member 64 into the image reading surface 36 via the sheet-shaped member 64. Accordingly, it is possible to suppress the occurrence of a portion of the original separating from the image reading surface 36 and the quality of the image data which is read from the image reading sensor 32 decreasing.

As described above, the fixing members 70a and 70b are formed using the same member, and the thickness L2 of the fixing member 70b in the Z axial direction is less than the thickness L1 of the fixing member 70a in the Z axial direction (refer to FIG. 6). Therefore, the stretch amount of the fixing member 70b in the Z axial direction is less than the stretch amount of the fixing member 70a in the Z axial direction.

Here, the term "stretch amount" refers to the length which is restored in a predetermined time when compressing with a weight of a predetermined magnitude and subsequently setting the weight to zero.

Therefore, as illustrated by the broken line in FIG. 9, when the user rotates the ADF unit 27 which is in a closed state in the opening direction, the bottom portion 27a of the ADF unit 27 separates from the top portion 12a of the device main body 12, and the portion of the reinforcing member 68 to which the fixing member 70b is stuck using the adhesive tape 76 is pulled up in the +Z axial direction.

Accordingly, the elastic member 66 which is bonded to the reinforcing member 68 and the sheet-shaped member 64 which is bonded to the elastic member 66 are also lifted up in the +Z axial direction, and a gap G is formed between the sheet-shaped member 64 and the image reading surface 36.

In other words, when the user rotates the ADF unit 27 which is in the closed state in FIG. 9, and the bottom portion 27a of the ADF unit 27 separates from the top portion 12a of the device main body 12, the portion of the sheet-shaped member 64 of the opposite side from the portion of the reinforcing member 68 to which the fixing member 70b is bonded is lifted up before the portion of the sheet-shaped member 64 of the opposite side from the portion of the reinforcing member 68 to which the fixing members 70a are bonded, and the gap G is formed between the sheet-shaped member 64 and the image reading surface 36. Therefore, air flows in from the gap G, and the sheet-shaped member 64 and the image reading surface 36 are released from the state of adhering to each other.

Hereinabove, the image reading device 14 of the multifunction printer 10 of the present embodiment is provided with the image reading surface 36, the ADF unit 27, the original retaining portion 62, and a plurality of fixing portions. The image reading surface 36 serves as the original receiving member on which the original which is read by the image reading sensor 32 is placed, the ADF unit 27 serves as the opening and closing body which includes a rotational shaft and rotates to be capable of opening and closing in relation to the image reading surface 36, the original retaining portion 62 includes the sheet-shaped member 64 which is capable of abutting the image reading surface 36, the elastic member 66 which is bonded to the sheet-shaped member 64, and the reinforcing member 68 which reinforces the elastic member 66 by being bonded to the opposite side of the elastic member 66 from the sheet-shaped member 64, the original retaining portion 62 retains the original which is placed on the image reading surface 36 in a state in which the ADF unit 27 is closed, and the plurality of fixing portions are elastic, transmit the weight of the ADF unit 27 to the reinforcing member 68 in a state in which the ADF unit 27 is closed, and fix the reinforcing member 68 to the ADF unit 27.

In the free-end side of the ADF unit 27 which is distanced from the rotational shaft J, the fixing portions include the fixing member 70b which serves as a first fixing portion which is disposed on the corner side of the reinforcing member 68, and the fixing members 70a which serve as second fixing portions which are disposed closer to the center side than the fixing member 70b in the reinforcing member 68, and, when the ADF unit 27 is opened, the stretch amount of the fixing member 70b is less than that of the fixing members 70a, and in the free-end side of the ADF unit 27, the corner side of the sheet-shaped member 64 separates from the image reading surface 36 before the center side.

In this case, air flows in from the gap G which is formed between the sheet-shaped member 64 and the image reading surface 36 and the sheet-shaped member 64 and the image reading surface 36 are released from the state of adhering to each other while securing the adherence of the original to the image reading surface 36.

The fixing member 70b is disposed on the original transport unit 28 side. Accordingly, when the user lifts the heavier side which is provided with the original transport unit 28 using the hand of the user, the gap G is formed on the side in the reinforcing member 68 which is provided with the original transport unit 28.

The fixing member 70a and the fixing member 70b are formed of the same members, and the thickness L2 of the fixing member 70b is less than the thickness L1 of the fixing member 70a.

Accordingly, the stretch amount of the fixing member 70b is less than the stretch amount of the fixing member 70a. Therefore, when the ADF unit 27 is rotated in a state of being closed in relation to the image reading surface 36, the portion of the reinforcing member 68 which is fixed to the fixing member 70b deforms so as to approach the opening and closing body side before the portions of the reinforcing member 68 which are fixed to the fixing members 70a.

The fixing member 70b is disposed on the edge portion of the reinforcing member 68. Accordingly, since the side portion of the reinforcing member 68 on which the fixing member 70b is disposed deforms so as to approach the ADF unit 27 side before the other portions, the gap G with the image reading surface 36 is easily formed at the edge portion of the reinforcing member 68.

The fixing members 70a and the fixing member 70b are a plurality of members which are disposed on the reinforcing member 68. Accordingly, it is possible to select the locations in the ADF unit 27 to which the fixing members 70a and the fixing member 70b are fixed.

Figure 10A:
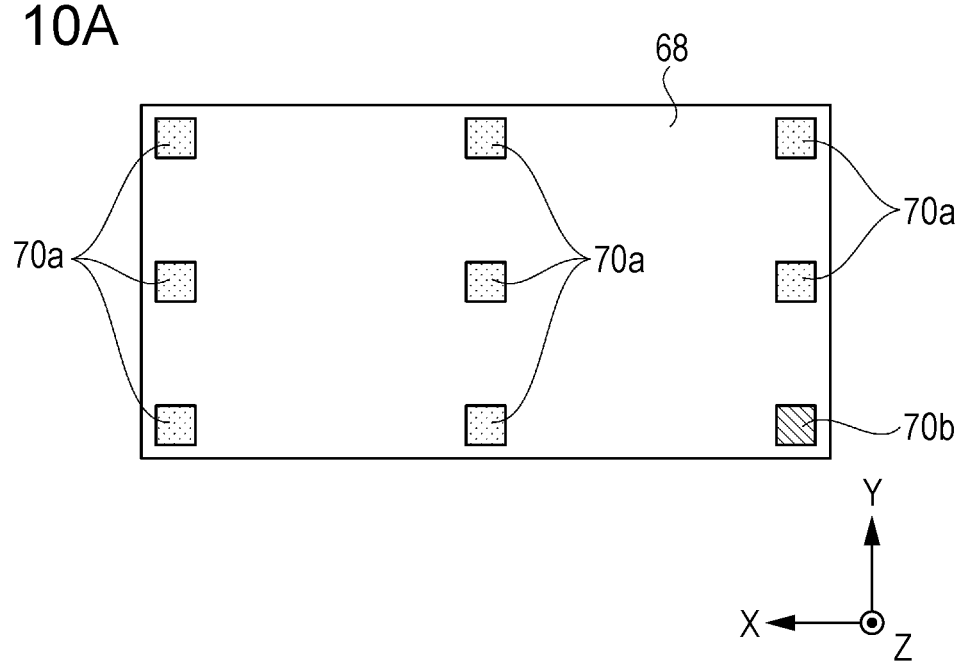
FIGS. 10A and 10B are diagrams illustrating other dispositions of fixing members in relation to a reinforcing member.
Figure 10B:
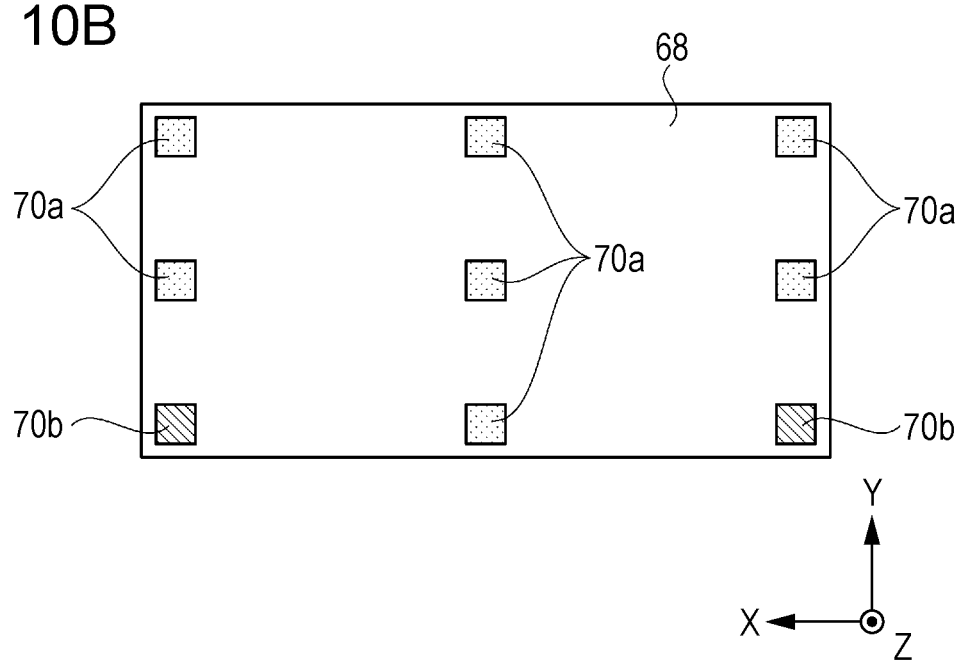

FIGS. 10A to 12C are diagrams illustrating other dispositions which differ from the dispositions of the fixing members in relation to the reinforcing member 68 of FIG. 8 described in the present embodiment. In the present embodiment, the fixing member 70b is disposed on the end portion in the +X axial direction; however, as illustrated in FIG. 10A, the fixing member 70b may be disposed on the end portion in the −X axial direction. As illustrated in FIG. 10B, the fixing members 70b may be disposed on both end portions in the X axial direction.

Figure 11A:
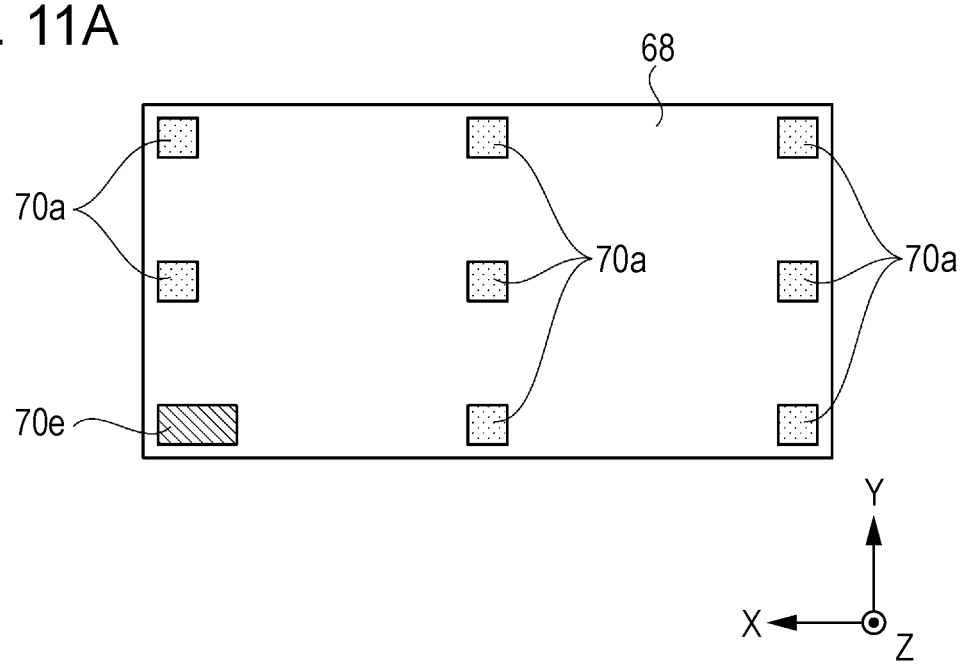
FIGS. 11A and 11B are diagrams illustrating other dispositions of the fixing members in relation to the reinforcing member.

Nine of the fixing members which are formed of the fixing members 70a and a fixing member 70e of FIG. 11A are disposed to have a uniform distance between adjacent fixing members in the X axial direction and in the Y axial direction. The one fixing member 70e among the nine fixing members is thinner in the Z axial direction than the remaining eight fixing members 70a, and is disposed at the end portion in the +X axial direction in the end portion in the −Y axial direction. As illustrated in FIG. 11A, the length of the fixing member 70e in the X axial direction is greater than the length of the fixing members 70a in the X axial direction.

Accordingly, the bonding surface of the fixing member 70e with the reinforcing member 68 and the ADF unit 27 is wider than the bonding surface of the fixing member 70a with the reinforcing member 68 and the ADF unit 27. Therefore, it is possible to suppress the occurrence of the fixing member 70e peeling off from the reinforcing member 68 and the ADF unit 27.

Figure 11B:
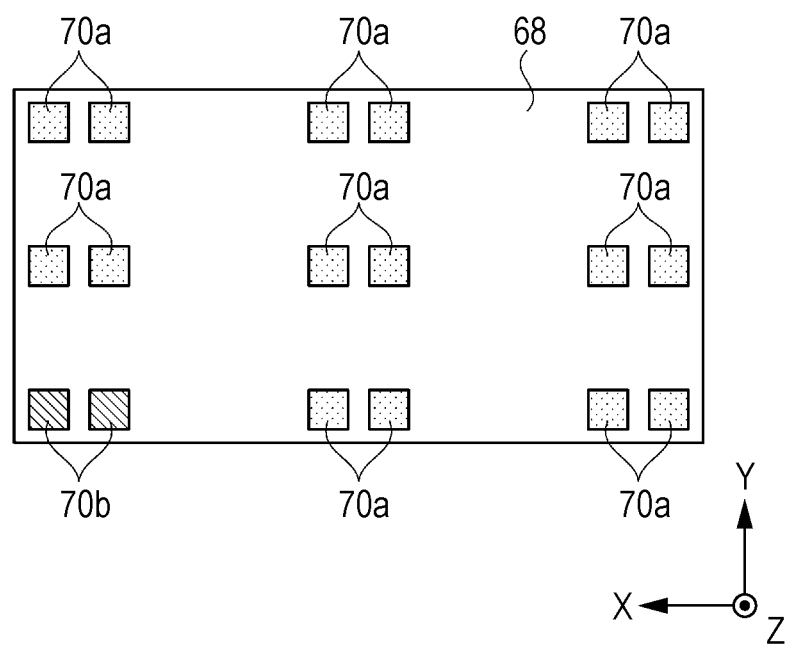

A total of 18 of the fixing members which are formed of the fixing members 70a and the fixing members 70b of FIG. 11B are disposed, six rows, in each of which three of the fixing members line up at both end portions and the center portion in the Y axial direction, line up in the X axial direction, and the rows are disposed in positions which are close to each other in the X axial direction two rows at a time. As illustrated in FIG. 11B, two of the fixing members 70b are disposed at the end portion in the +X axial direction in the end portion in the −Y axial direction, and the fixing members 70a may be disposed in the other locations.

Figure 12A:
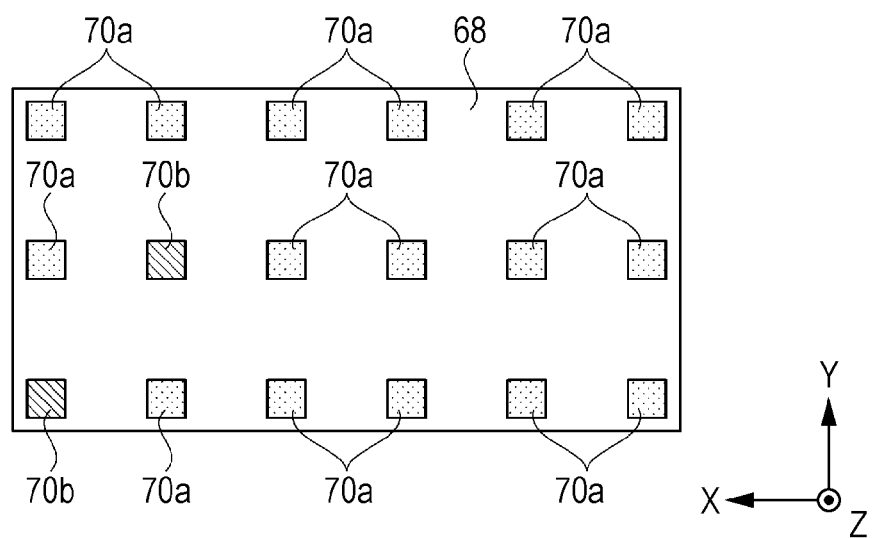
FIGS. 12A to 12C are diagrams illustrating other dispositions of the fixing members in relation to the reinforcing member.

The 18 fixing members which are formed of the fixing members 70a and the fixing members 70b of FIG. 12A are disposed, three rows, in each of which six of the fixing members line up in the X axial direction, line up in the Y axial direction, and the distance in the X axial direction and the Y axial direction between adjacent fixing members is substantially equal. As illustrated in FIG. 12A, two of the fixing members 70b which are lined up in a diagonal direction in relation to the X axial direction are disposed at the end portion in the +X axial direction in the −Y axial direction, and the fixing members 70a may be disposed in the other locations.

Accordingly, when the ADF unit 27 which is in a state of being closed in relation to the image reading surface 36 is rotated in the opening direction, gaps are formed in order from the corner portion of the sheet-shaped member 64 toward a direction which is diagonal in relation to the X axial direction, and it is possible to allow air to flow in.

Figure 12B:
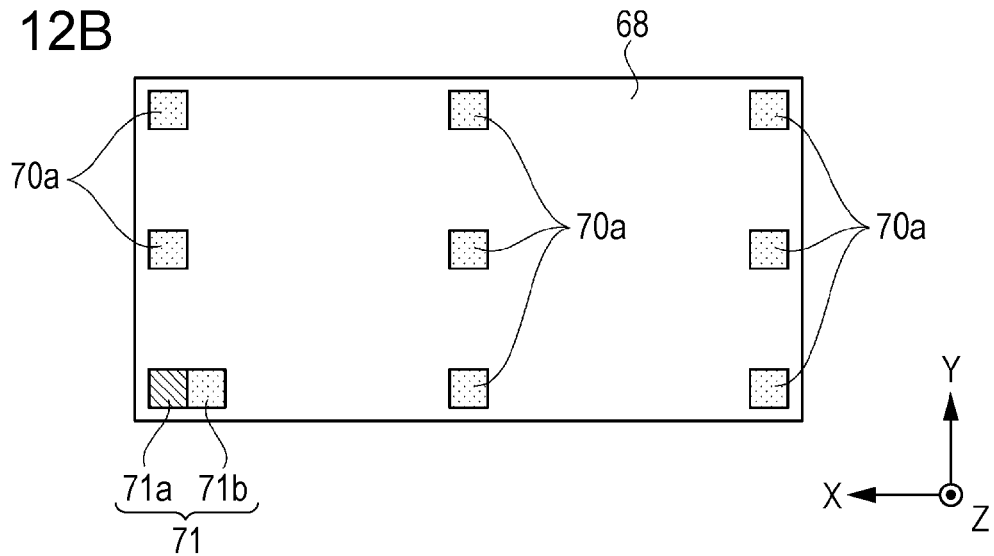
Figure 12C:
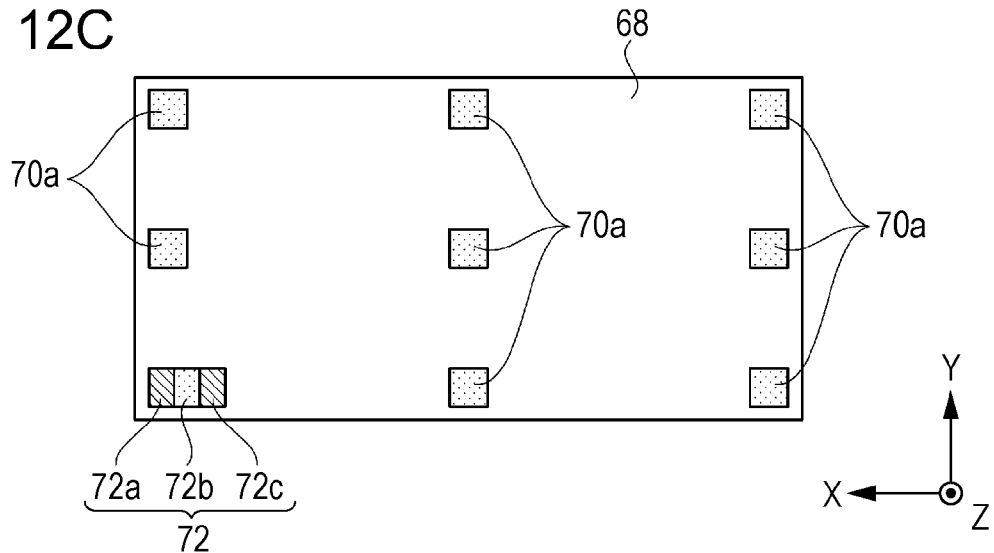

FIGS. 12B and 12C are diagrams in which the fixing members which include portions of differing thickness in the Z axial direction are disposed. FIGS. 13A to 13F are diagrams illustrating the fixing members which include portions of differing thickness in the Z axial direction. In FIG. 12B, nine fixing members which are formed of the fixing members 70a and a fixing member 71 are disposed such that three rows, in which three fixing members are lined up in the X axial direction, are lined up in the Y axial direction.

Figure 13A:
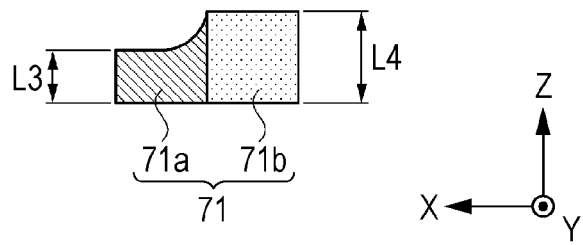
FIGS. 13A to 13F are diagrams illustrating fixing members which include portions of differing thickness.

FIG. 13A is a diagram illustrating the thickness in the Z axial direction of the fixing member 71 as viewed from the Y axial direction. The fixing member 71 is formed of an elastic portion 71a and an elastic portion 71b, and a thickness L3 of the end portion of the elastic portion 71a in the Z axial direction is less than a thickness L4 of the elastic portion 71b in the Z axial direction. The thickness L4 of the elastic portion 71b in the Z axial direction is the same as the thickness L1 (refer to FIG. 6) of the fixing member 70a in the Z axial direction. As illustrated in FIG. 12B, the fixing member 71 which has a differing thickness in the Z axial direction is disposed on the end portion in the +X axial direction in the −Y axial direction, and the fixing members 70a may be disposed in the other locations.

Figure 13B:
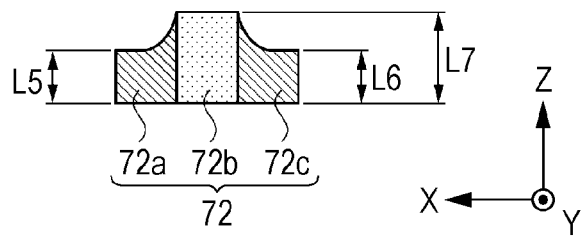

In FIG. 12C, nine fixing members which are formed of the fixing members 70a and a fixing member 72 are disposed such that three rows, in which three fixing members are lined up in the X axial direction, are lined up in the Y axial direction. FIG. 13B is a diagram illustrating the thickness in the Z axial direction of the fixing member 72 as viewed from the Y axial direction. The fixing member 72 is formed of an elastic portion 72b and elastic portions 72a and 72c on either side of the elastic portion 72b, and thicknesses L5 and L6 of the end portions of the elastic portions 72a and 72c in the Z axial direction are less than a thickness L7 of the elastic portion 72b in the Z axial direction. The thickness L7 of the elastic portion 72b in the Z axial direction is the same as the thickness L1 of the fixing member 70a in the Z axial direction. As illustrated in FIG. 12C, the fixing member 72 which has a differing thickness in the Z axial direction is disposed on the end portion in the +X axial direction in the −Y axial direction, and the fixing members 70a may be disposed in the other locations.

Figure 13C:
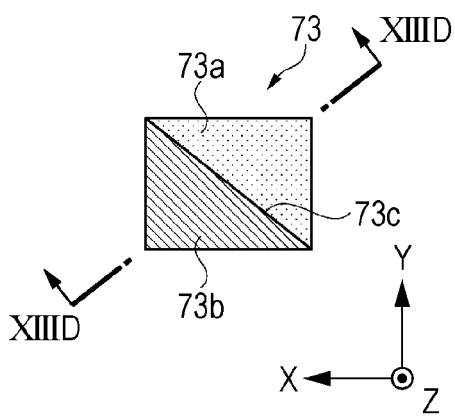

FIG. 13C is a diagram of the fixing member 73 as viewed from the +Z axial direction. The fixing member 73 is a member which is formed of an elastic portion 73a and an elastic portion 73b, and a boundary line 73c between the elastic portion 73a and the elastic portion 73b as viewed from the Z axial direction is positioned on the diagonal line of the rectangular fixing member 73.

Figure 13D:
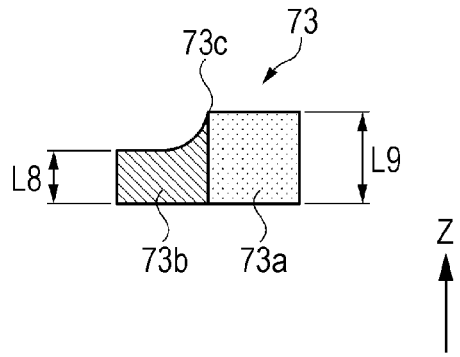

FIG. 13D is a cross sectional diagram of the fixing member 73 as viewed from the direction of the arrows by the XIIID-XIIID line which is taken across the fixing member 73. A thickness L8 of the elastic portion 73b in the Z axial direction is less than a thickness L9 of the end portion of the elastic portion 73a in the Z axial direction. The fixing member 73 which is configured in this manner is disposed on the end portion in the +X axial direction in the −Y axial direction, and the fixing members 70a may be disposed in the other locations.

Figure 13E:
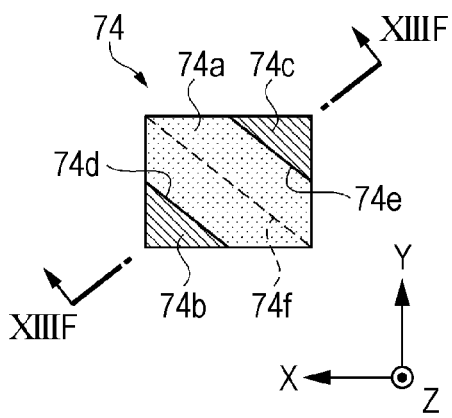

FIG. 13E is a diagram of a fixing member 74 as viewed from the +Z axial direction. The fixing member 74 is a member which is formed of an elastic portion 74a, an elastic portion 74b, and an elastic portion 74c, a boundary line 74d between the elastic portion 74a and the elastic portion 74b viewed from the Z axial direction and a boundary line 74e between the elastic portion 74a and the elastic portion 74c viewed from the Z axial direction are substantially parallel to a diagonal line 74f of the rectangular fixing member 74.

Figure 13F:
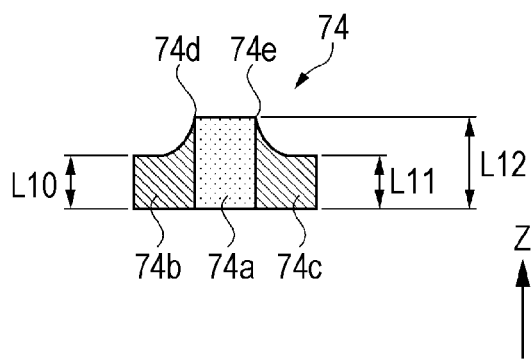

FIG. 13F is a cross sectional diagram of the fixing member 74 as viewed from the direction of the arrows by the XIIIF-XIIIF line which is taken across the fixing member 74. Thicknesses L10 and L11 of the elastic portions 74b and 74c in the Z axial direction are less than a thickness L12 of the elastic portion 74a in the Z axial direction. The fixing member 74 which is configured in this manner is disposed on the end portion in the +X axial direction in the −Y axial direction, and the fixing members 70a may be disposed in the other locations.

Embodiment 2

Figure 14:
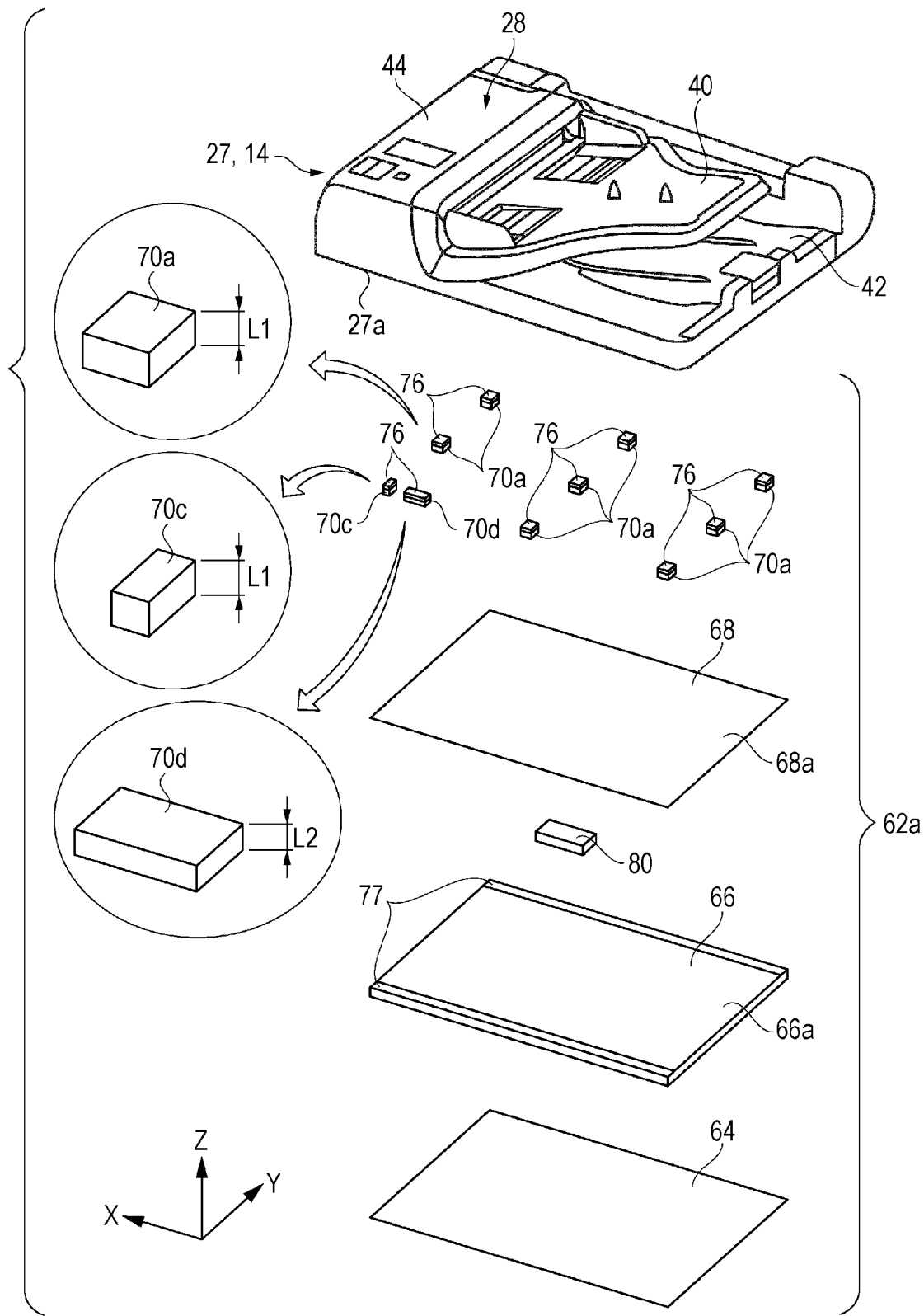
FIG. 14 is an exploded perspective view of the original retaining portion which is attached to the bottom portion of the opening and closing body in an embodiment 2.

In the embodiment 2, description is given of an image reading device in which an insertion member is provided between the elastic member 66 and the reinforcing member 68 in the original retaining portion. FIG. 14 is an exploded perspective view of an original retaining portion 62a which is attached to the bottom portion of the ADF unit 27 in the present embodiment.

The fixing members 70a, 70c, and 70d are disposed on the top surface 68a of the +Z axial direction side of the reinforcing member 68. In the present embodiment, the fixing members 70a, 70c, and 70d are formed of a sponge material.

The fixing members 70a, 70c, and 70d illustrated inside the circles in FIG. 14 are respectively enlarged perspective views of the fixing members 70a, 70c and 70d illustrated in the exploded perspective view of the original retaining portion 62a. The fixing member 70a is a cuboid in which the shape as viewed from the Z axial direction is a square (in the present embodiment, the length of one side is 17 mm).

The external length of the fixing member 70d in the X axial direction is greater than the external lengths of the fixing members 70a and 70c. In the present embodiment, the external length of the fixing member 70d is approximately four times the external length of the fixing member 70c.

The thickness L2 of the fixing member 70d in the Z axial direction is less than the thickness L1 of the fixing members 70a and 70c. The thickness L1 of the fixing member 70a in the Z axial direction is less than the thickness L1 of the fixing member 70c. The fixing members 70a, 70c, and 70d are formed of the same sponge material. Therefore, the stretch amount of the fixing member 70d is less than that of the fixing members 70a and 70c.

Figure 15:
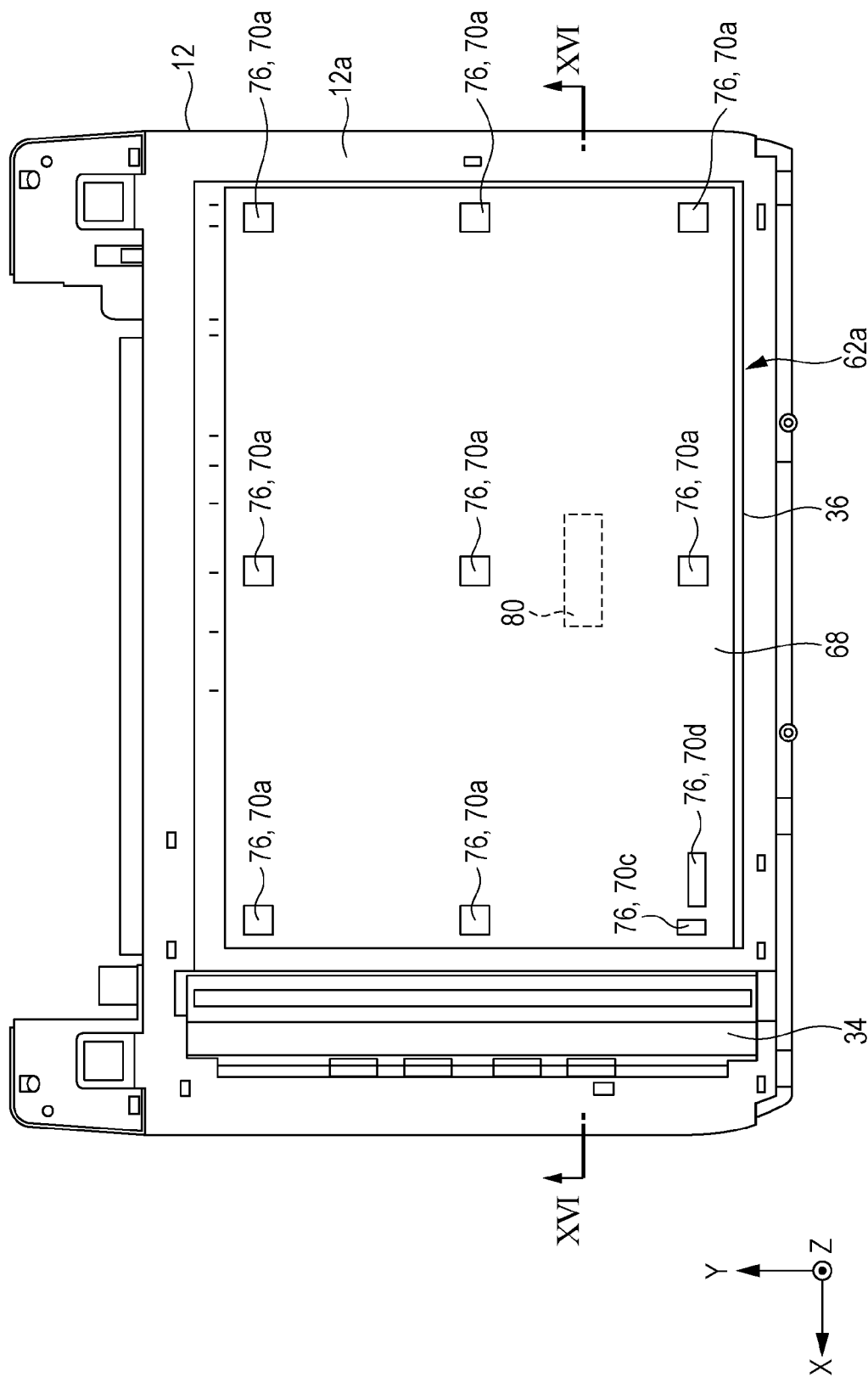
FIG. 15 is a plan view illustrating the positional relationship of the original retaining portion to the original receiving member in the embodiment 2.

FIG. 15 is a plan view illustrating the positional relationship of the original retaining portion 62a to the image reading surface 36 in a state in which the ADF unit 27 is closed in relation to the image reading surface 36. The original retaining portion 62a abuts the entire surface of the image reading surface 36 in a position corresponding to the image reading surface 36 in a state in which the ADF unit 27 is closed in relation to the device main body 12.

Three of the fixing members 70a which are lined up on both end portions and the center portion in the X axial direction are disposed on the end portion in the +Y axial direction on the top surface 68a of the reinforcing member 68. Three of the fixing members 70a which are lined up on both end portions and the center portion in the X axial direction are disposed on the center portion in the +Y axial direction on the top surface 68a of the reinforcing member 68.

On the end portion in the −Y axial direction on the top surface 68a of the reinforcing member 68, one fixing member 70a is disposed on the center portion in the X axial direction, one fixing member 70a is disposed on the end portion in the −X axial direction, and one fixing member 70d and one fixing member 70c are disposed on the end portion in the +X axial direction. The one fixing member 70d and the one fixing member 70c which are disposed on the end portion in the +X axial direction are disposed such that the distance therebetween is several mm.

The adhesive tape 76 is stuck to the surface of the +Z axial direction side, that is, the top surface, and the surface of the −Z axial direction side, that is, the bottom surface of the fixing members 70a, 70c, and 70d. The surface of the +Z axial direction side (the top surface) of the fixing members 70a, 70c, and 70d is stuck to the bottom portion 27a of the ADF unit 27 in a region which faces the image reading surface 36 via the adhesive tape 76. The surface of the −Z axial direction side (the bottom surface) of the fixing members 70a, 70c, and 70d is stuck to the top surface 68a of the reinforcing member 68 via the adhesive tape 76.

Figure 16:
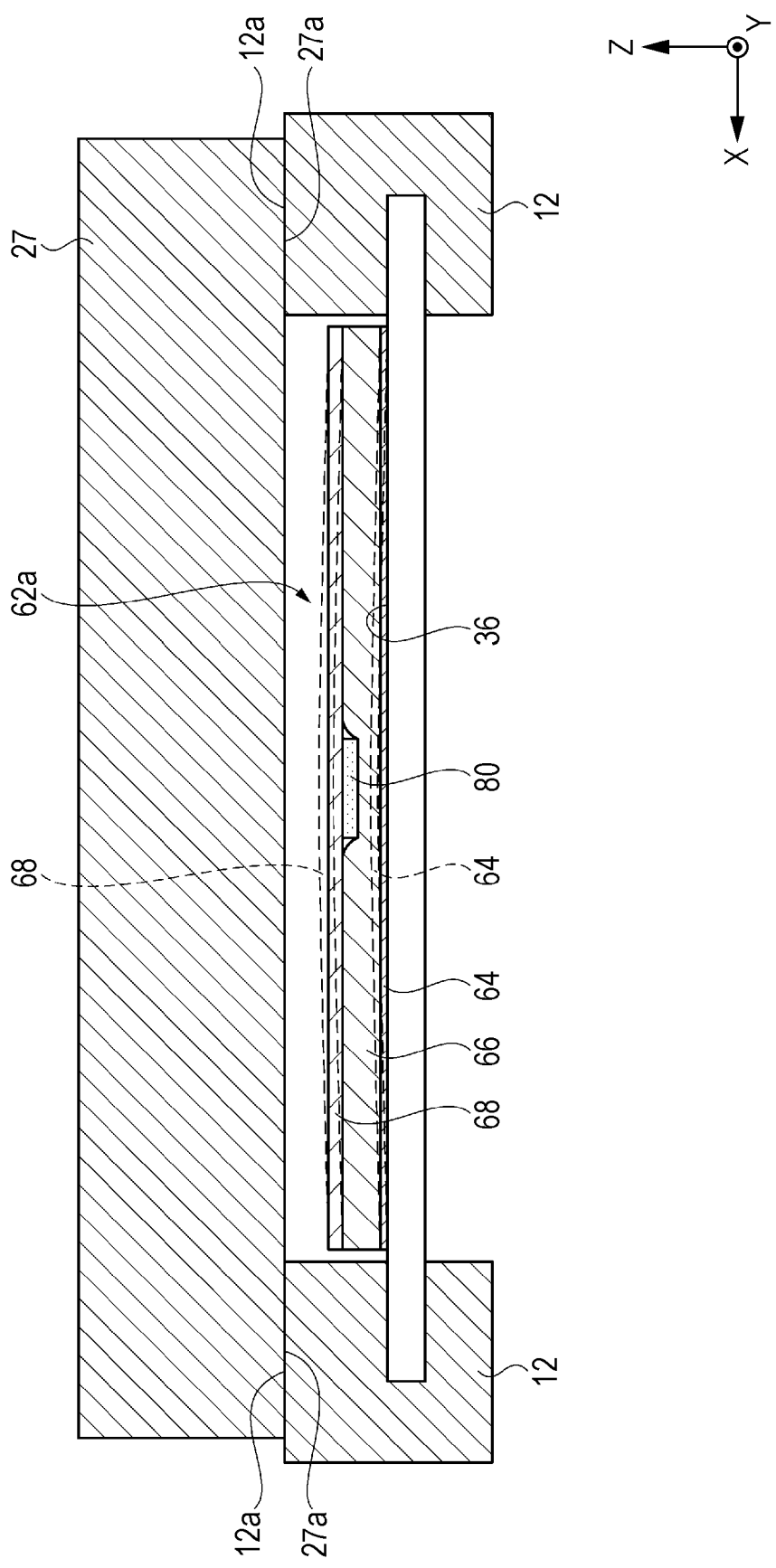
FIG. 16 is a cross sectional diagram illustrating the positional relationship of the original retaining portion to the original receiving member in the embodiment 2.

FIG. 16 is a diagram as viewed from the Y axial direction and is a cross sectional diagram taken along the line XVI-XVI of the cross section position of FIG. 15 illustrating the positional relationship of the original retaining portion 62a to the image reading surface 36 in a state in which the ADF unit 27 is closed on the image reading surface 36.

An insertion member 80 of FIGS. 14 to 16 is a member which is disposed between the elastic member 66 and the reinforcing member 68 in the original retaining portion 62a. As illustrated in FIG. 16, the insertion member 80 is disposed in a state of being inserted between the reinforcing member 68 and the elastic member 66. The insertion member 80 illustrated by the broken line in FIG. 15 is disposed in the center portion in the X axial direction of the reinforcing member 68, and, in the Y axial direction, is disposed in a position further in the −Y axial direction than the center portion.

When the ADF unit 27 of FIG. 16 is in a state of being closed on the image reading surface 36, the reinforcing member 68 is pressed in the −Z axial direction by the fixing members 70a, 70b, and 70c of FIG. 15. Accordingly, the sheet-shaped member 64 is in a state of abutting and pressing the image reading surface 36. The insertion member 80 assumes a state of entering a portion at which the elastic member 66 is compressed to become concave shaped.

When the ADF unit 27 in the state of FIG. 16 rotates in the opening direction, the pressing force which is exerted on the reinforcing member 68 in the −Z axial direction by the fixing members 70a, 70b, and 70c until this point is no longer exerted, and the reinforcing member 68 deforms to curve into a convex shape in the +Z axial direction as illustrated by the broken lines. Accordingly, the elastic member 66 and the sheet-shaped member 64 both deform to curve into a convex shape in the +Z axial direction.

Since the insertion member 80 is disposed in a position further in the −Y axial direction than the center portion in the Y axial direction, the end portion of the opposite side from the rotational shaft J in the Y axial direction of the reinforcing member 68, the elastic member 66, and the sheet-shaped member 64 deforms to curve into a convex shape in the +Z axial direction. Therefore, a gap is formed between the end portion of the opposite side from the rotational shaft J in the Y axial direction of the sheet-shaped member 64 and the image reading surface 36, air flows in from the gap, and the sheet-shaped member 64 and the image reading surface 36 are released from the state of adhering to each other.

In the present embodiment, the fixing portion includes the fixing member 70c which serves as a third fixing portion which transmits the weight of the ADF unit 27 to the reinforcing member 68 by augmenting the fixing member 70d and is disposed on the end portion which forms the corner of the reinforcing member 68 in a state in which the stretch amount of the fixing member 70c is greater than that of the fixing member 70d which serves as the first fixing portion, and the ADF unit 27 which serves as the opening and closing body is in a state of being closed.

In this case, when the ADF unit 27 is opened, air flows in from the gap which is formed between the sheet-shaped member 64 and the image reading surface 36 and the sheet-shaped member 64 and the image reading surface 36 are released from the state of adhering to each other while securing the adherence of the original to the image reading surface 36 in the state in which the ADF unit 27 is closed. The other configuration of the present embodiments is the same as the configuration described in the embodiment 1.

The bonding surfaces of the fixing member 70d (the first fixing portion) with the reinforcing member 68 and the ADF unit 27 are wider than the bonding surfaces of the fixing member 70a (the second fixing portion) and the fixing member 70c (the third fixing portion) with the reinforcing member 68 and the ADF unit 27. Accordingly, when the ADF unit 27 is rotated, the occurrence of the fixing member 70d peeling off from the ADF unit 27 and the reinforcing member 68 is suppressed.

Figure 17A:
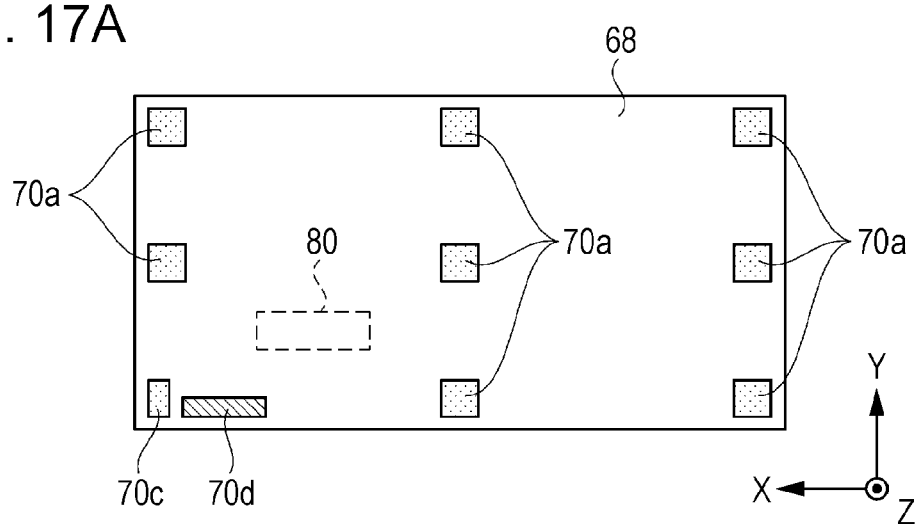
FIGS. 17A and 17B are diagrams illustrating the dispositions of the fixing members and an insertion member in the reinforcing member.
Figure 17B:
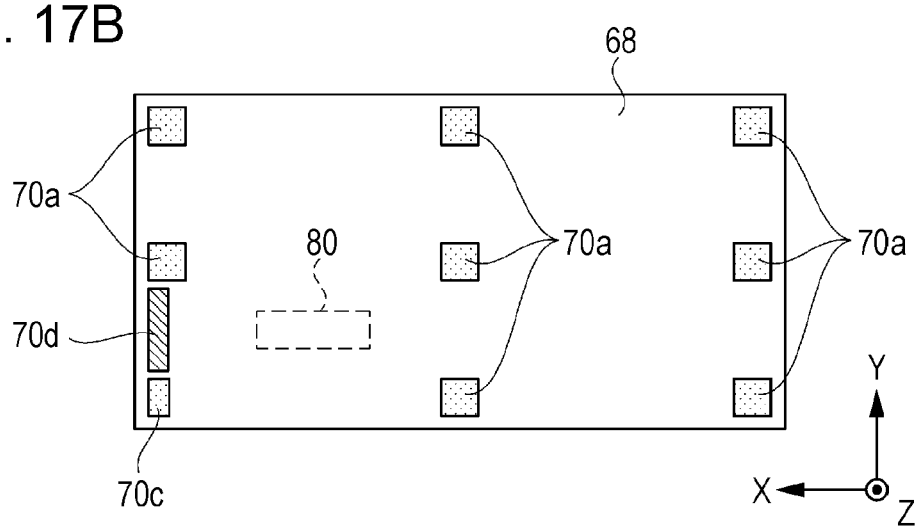

FIGS. 17A and 17B are diagrams illustrating the dispositions of the fixing members 70a, 70c, and 70d, and the insertion member 80 in the reinforcing member 68. In the present embodiment, the insertion member 80 of FIG. 15 is disposed in the center portion in the X axial direction; however, as illustrated in FIG. 17A, the insertion member 80 may be disposed on the +X axis side in the X axial direction. While not depicted, the insertion member 80 may be disposed on the −X axis side in the X axial direction of the reinforcing member 68.

In the present embodiment, the fixing member 70d is provided on the −X axial direction side of the fixing member 70c; however, as illustrated in FIG. 17B, the fixing member 70d may be provided on the +Y axial direction side of the fixing member 70c.

Figure 17C:
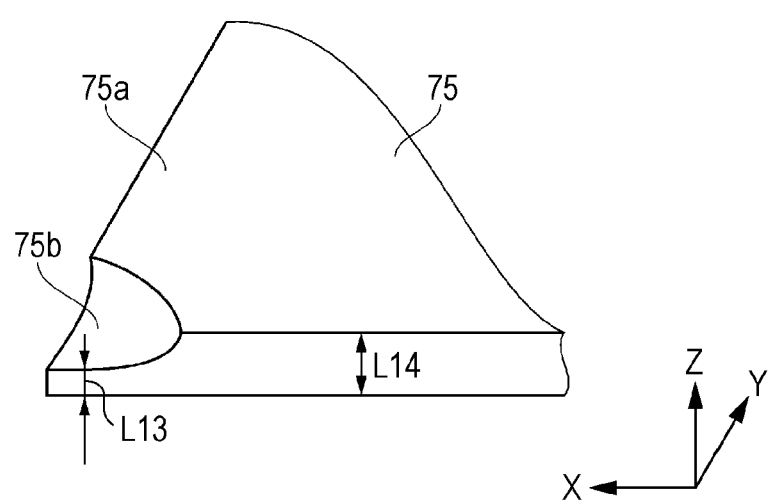
FIG. 17C is a perspective view illustrating a portion of the fixing member which is formed integrally.

FIG. 17C is a perspective view illustrating a portion of the fixing member 75 which is formed integrally. In the embodiments 1 and 2, the fixing portion is configured to be formed of a plurality of fixing members; however, the fixing portion may be formed integrally of a member such as a sponge material and be formed of the fixing member 75 which has great reinforcing capabilities across the entire surface of the elastic member 66.

The fixing member 75 is formed integrally of an elastic portion 75a and an elastic portion 75b, the elastic portion 75b is formed on the end portion in the +X axial direction of the end portion in the −Y axial direction, and a thickness L13 of the elastic portion 75b in the Z axial direction is less than a thickness L14 of the elastic portion 75a in the Z axial direction.

The opening and closing body in the embodiments 1 and 2 is configured using the ADF unit 27 which is provided with the original transport unit 28; however, the opening and closing body is also applicable to an image reading device in which the opening and closing body is formed of a cover which rotates to be capable of opening and closing on the image reading surface which serves as the original receiving member.

The fixing members 70a to 70d which serve as the fixing portions of the embodiments 1 and 2 are configured of a sponge material; however, the fixing members 70a to 70d may be formed of spring members which are coil shaped. The reinforcing member 68 in the original retaining portion 62 is formed of a plate-shaped member; however, the reinforcing member 68 may be configured by rendering a thread-shaped member as a mesh shaped member and reinforcing the elastic member.

In the description given hereinabove, the difference in the stretch amount is described as a difference based on the difference in the thickness of the fixing member 70; however, it is also possible to change the stretch amount based on differences in the material of the fixing member 70. Specifically, it is possible to reduce the stretch amount by selecting a material in which the amount of restoration is small.

The entire disclosure of Japanese Patent Application No.: 2014-133753, filed Jun. 30, 2014 is expressly incorporated by reference herein.

What is claimed is:

1. An image reading device comprising:
an original retaining portion
that includes
an original receiving member on which an original which is read by an image reading sensor is placed,
an opening and closing body which includes a rotational shaft and rotates to be capable of opening and closing in relation to the original receiving member,
a sheet-shaped member capable of abutting the original receiving member,
an elastic member which is bonded to the sheet-shaped member, and
a reinforcing member which is bonded to an opposite side from the sheet-shaped member of the elastic member and reinforces the elastic member, and
that retains the original which is placed on the original receiving member in a state in which the opening and closing body is closed; and
a plurality of fixing portions which are elastic, transmit a weight of the opening and closing body to the reinforcing member in a state in which the opening and closing body is closed, and fix the reinforcing member to the opening and closing body,
wherein, in a free end side which is distanced from the rotational shaft in the reinforcing member, the fixing portions include
a first fixing portion which is disposed on a corner side of the reinforcing member, and
a second fixing portion which is disposed closer to a center side of the reinforcing member than the first fixing portion,
wherein, when the opening and closing body is opened, a stretch amount of the first fixing portion is less than that of the second fixing portion, and
wherein, at the free end side of the opening and closing body, a corner side of the sheet-shaped member separates from the original receiving member before the center side.

2. The image reading device according to claim 1,
wherein the opening and closing body is further provided with an original transport unit which transports the original, and
wherein the first fixing portion is disposed on the original transport unit side.

3. The image reading device according to claim 1,
wherein the fixing portions include a third fixing portion which has a greater stretch amount than the first fixing portion, reinforces the first fixing portion in a state in which the opening and closing body is closed, transmits the weight of the opening and closing body to the reinforcing member, and is disposed on at least one side of an end portion which forms a corner of the reinforcing member.

4. The image reading device according to claim 1,
wherein the first fixing portion and the second fixing portion are formed of a same member, and
wherein a thickness of the first fixing portion is less than a thickness of the second fixing portion.

5. The image reading device according to claim 1,
wherein the first fixing portion is disposed on an edge portion of the reinforcing member.

6. The image reading device according to claim 5,
wherein bonding surfaces of the first fixing portion with the reinforcing member and the opening and closing body are wider than bonding surfaces of the second fixing portion with the reinforcing member and the opening and closing body.

* * * * *